（12）United States Patent
Masuda et al.

(10) Patent No.: US 11,797,163 B2
(45) Date of Patent: Oct. 24, 2023

(54) DISPLAY CONTROL DEVICE AND DISPLAY CONTROL METHOD FOR DISPLAYING IMAGES INCLUDING ELECTRONIC LABELS

(71) Applicant: Nippon Telegraph and Telephone Corporation, Tokyo (JP)

(72) Inventors: Takeshi Masuda, Musashino (JP); Haruo Oishi, Musashino (JP); Akira Kataoka, Musashino (JP); Kimio Tsuchikawa, Musashino (JP); Fumihiro Yokose, Musashino (JP); Yuki Urabe, Musashino (JP); Makoto Komiyama, Musashino (JP); Sayaka Yagi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/771,979

(22) PCT Filed: Feb. 26, 2020

(86) PCT No.: PCT/JP2020/007883
§ 371 (c)(1),
(2) Date: Apr. 26, 2022

(87) PCT Pub. No.: WO2021/084769
PCT Pub. Date: May 6, 2021

(65) Prior Publication Data
US 2022/0398007 A1 Dec. 15, 2022

(30) Foreign Application Priority Data

Oct. 30, 2019 (WO) .................. PCT/JP2019/042692

(51) Int. Cl.
*G06F 3/04845* (2022.01)
*G06F 3/0482* (2013.01)

(52) U.S. Cl.
CPC ........ *G06F 3/04845* (2013.01); *G06F 3/0482* (2013.01)

(58) Field of Classification Search
CPC .......................... G06F 3/04845; G06F 3/0482
See application file for complete search history.

(56) References Cited

U.S. PATENT DOCUMENTS 9,037,600 B1\* 5/2015 Garrigues ............... G06F 16/58
707/769
10,198,485 B2\* 2/2019 Parker ..................... G06T 11/00
(Continued)

OTHER PUBLICATIONS

Yellowfin, "Report annotations," Yellowfin Guide 8—Yellowfin wiki, Dec. 21, 2018, retrieved on Oct. 7, 2019, retrieved from URL <https://wiki.yellowfin.co.jp/pages/viewpage.action?pageId=884862>, 11 pages (with English Translation).

*Primary Examiner* — Beau D Spratt
(74) *Attorney, Agent, or Firm* — Fish & Richardson P.C.

(57) ABSTRACT

A display control device acquires event data, that is, data expressed as a set of fixed units of data, and uses the acquired event data to display an image of the event data visualized according to a predetermined visualization method. Additionally, in the case of receiving an operation of attaching an electronic label to the displayed image, the display control device stores information about the electronic label, the event data, and setting information related to the image when the electronic label was attached in association with each other in storage. Also, in the case of receiving the specification of an electronic label to be restored from among the electronic labels, the display control device acquires the data of the electronic label as well as the event data and setting information associated with the (Continued)

electronic label from the storage, and restores the image with the electronic label attached.

18 Claims, 22 Drawing Sheets

(56) References Cited

U.S. PATENT DOCUMENTS

| | | | | |
|---|---|---|---|---|
| 2006/0082594 | A1* | 4/2006 | Vafiadis | G06F 40/166 |
| | | | | 345/629 |
| 2006/0274978 | A1* | 12/2006 | Fukuda | G06F 16/58 |
| 2010/0005411 | A1* | 1/2010 | Duncker | G06F 16/954 |
| | | | | 715/769 |
| 2013/0091465 | A1* | 4/2013 | Kikin-Gil | G06F 3/04847 |
| | | | | 715/817 |
| 2016/0171764 | A1* | 6/2016 | Chew | G06T 17/20 |
| | | | | 345/423 |
| 2017/0236314 | A1* | 8/2017 | Ruble | G06F 40/106 |
| | | | | 345/592 |
| 2020/0394441 | A1* | 12/2020 | Wen | G06N 3/045 |
| 2021/0117056 | A1* | 4/2021 | Kuo | G06F 3/0484 |

* cited by examiner

Fig. 3

| SERIAL NUMBER | SOURCE FILE PATH | ROW NUMBER | START TIME | END TIME | WINDOW TITLE | APPLICATION |
|---|---|---|---|---|---|---|
| ... | ... | ... | ... | ... | ... | ... |
| 122 | C:¥user¥data¥20180925.csv | 1 | 2018/9/25 10:15:23 | 2018/9/25 10:19:10 | ORDER LIST | EXCEL |
| 123 | C:¥user¥data¥20180925.csv | 2 | 2018/9/25 10:19:10 | 2018/9/25 10:22:08 | ORDER DETAILS | IEXPLORE |
| 124 | C:¥user¥data¥20180925.csv | 3 | 2018/9/25 10:22:08 | 2018/9/25 10:24:44 | SPECIAL_ORDER_LIST.xlsx | POWERPOINT |
| 125 | C:¥user¥data¥20180925.csv | 4 | 2018/9/25 10:24:44 | 2018/9/25 10:29:01 | ORDER DETAILS | IEXPLORE |
| ... | ... | ... | ... | ... | ... | ... |

Fig. 4

| LABEL NUMBER | ATTACHMENT DATE/TIME | COMMENT | RELATIVE COORDINATES | EVENT DATA ASSOCIATION ID | ATTACHMENT TIME VISUALIZATION SETTING ID |
|---|---|---|---|---|---|
| ... | ... | ... | ... | ... | ... |
| 32 | 2018/9/25 10:15:23 | LABEL COMMENT... | 25,42 | 30 | 11 |
| ... | ... | ... | ... | ... | ... |

Fig. 5

| EVENT DATA ASSOCIATION ID | EVENT DATA SERIAL NUMBER |
|---|---|
| ⋮ | ⋮ |
| 30 | 122 |
| ⋮ | ⋮ |
| 32 | 122 |
| 33 | 122 |
| 33 | 126 |
| 33 | 128 |
| ⋮ | ⋮ |

Fig. 6

| ATTACHMENT TIME VISUALIZATION SETTING ID | VISUALIZATION TYPE | VISUALIZATION SETTING STRING |
|---|---|---|
| ... | ... | ... |
| 11 | TIMELINE DISPLAY | PATTERN SETTING ("EXCEL", "PATTERN 1")<br>PATTERN SETTING ("IEXPLORE", "PATTERN 2"), ...(ABRIDGED)...<br>MAGNIFICATION (1.0), HORIZONTAL SCROLLING (0.0), VERTICAL SCROLLING (0.0) |
| ... | ... | ... |

Fig. 19

| SERIAL NUMBER | SOURCE FILE PATH | ROW NUMBER | START TIME | END TIME | WINDOW TITLE | APPLICATION | TAG 1 | TAG 2 | TAG 3 | TAG 4 | TAG 5 |
|---|---|---|---|---|---|---|---|---|---|---|---|
| ... | ... | ... | ... | ... | ... | ... | ... | ... | ... | ... | ... |
| 122 | C:\user\data\20180925.csv | 1 | 2018/9/25 10:15:23 | 2018/9/25 10:19:10 | ORDER LIST | EXCEL | OFFICE | ORDER LIST | A | X | (1) |
| 123 | C:\user\data\20180925.csv | 2 | 2018/9/25 10:19:10 | 2018/9/25 10:22:08 | ORDER DETAILS 1 | IEXPLORE | WEB | ORDER DETAILS 1 | A | X | (2) |
| 124 | C:\user\data\20180925.csv | 3 | 2018/9/25 10:22:08 | 2018/9/25 10:24:44 | SPECIAL_ORDER_LIST.xlsx | POWERPOINT | OFFICE | SPECIAL_ORDER_LIST.xlsx | B | Y | (2) |
| 125 | C:\user\data\20180925.csv | 4 | 2018/9/25 10:24:44 | 2018/9/25 10:29:01 | ORDER DETAILS 2 | IEXPLORE | WEB | ORDER DETAILS 2 | B | X | (3) |
| ... | ... | ... | ... | ... | ... | ... | ... | ... | ... | ... | ... |

Fig. 22
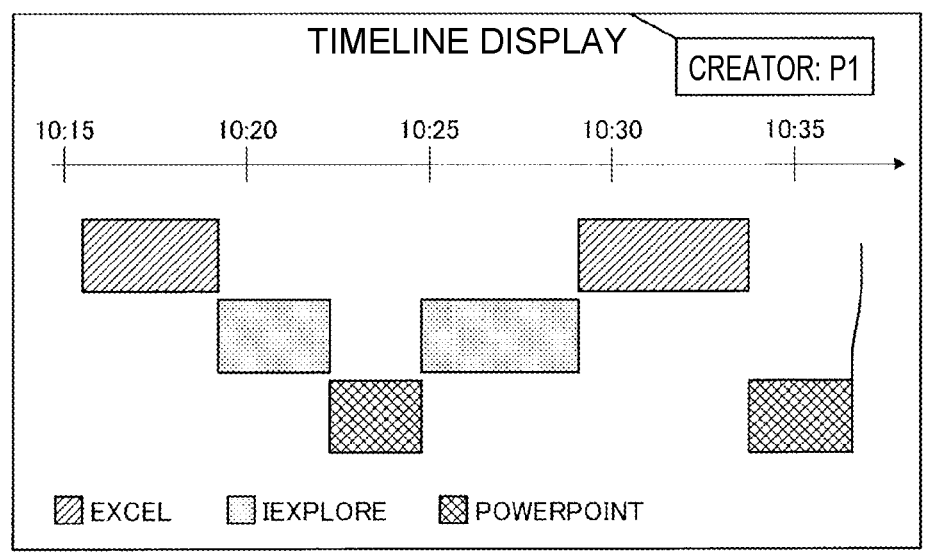
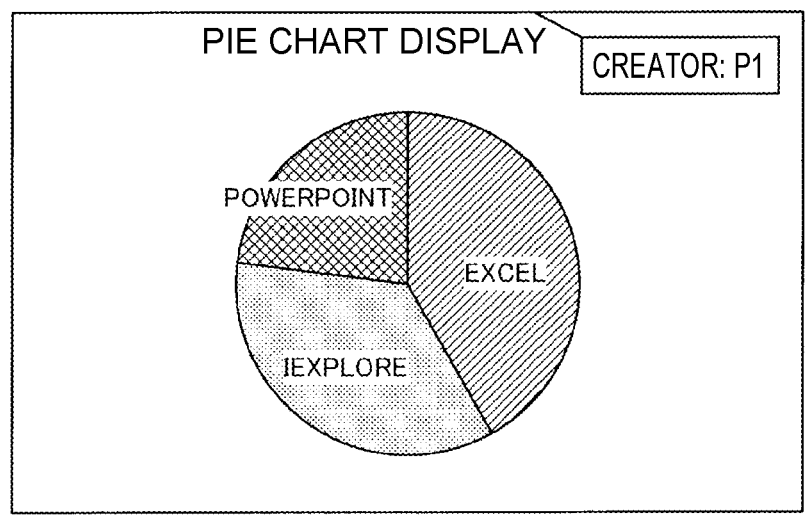

DISPLAY CONTROL DEVICE AND DISPLAY CONTROL METHOD FOR DISPLAYING IMAGES INCLUDING ELECTRONIC LABELS

CROSS-REFERENCE TO RELATED APPLICATIONS

This application is a National Stage application under 35 U.S.C. § 371 of International Application No. PCT/JP2020/007883, having an International Filing Date of Feb. 26, 2020, and of International Application No. PCT/JP2019/042692, having an International Filing Date of Oct. 30, 2019. The disclosure of the prior applications are considered part of the disclosure of this application, and are incorporated in their entirety into this application.

TECHNICAL FIELD

The present invention relates to a display control device and a display control method.

BACKGROUND ART

In the related art, tools for visualizing and graphing data for display are referred to as "business intelligence (BI) tools", and are becoming widespread (for example, see Non-Patent Literature 1). BI tools support provide support for generating graphs that are easy to understand visually, but in many cases it is desirable to attach information and comments regarding insights and realizations as electronically expressed labels (hereinafter referred to as electronic labels) with respect to the process of analysis or the analyzed result.

In such cases, in the related art, the BI tool itself has an electronic label function like in Non-Patent Literature 1, but the functionality is basic and mostly limited to attaching information to dates, and it is not possible to flexibly attach electronic labels to multiple types of graphs. In the case of wanting to attach electronic labels more flexibly, there is a method of capturing the screen from a BI tool, pasting the captured image into presentation software or the like, and then attaching comments by overlaying a callout mark or the like onto the image.

CITATION LIST

Non-Patent Literature

Non-Patent Literature 1: Yellowfin Guide 8, page explaining "Report Annotation" function, [online], [retrieved Oct. 17, 2019], Internet <https://wiki.yellowfin.co.jp/pages/viewpage.action?pageI d=10945739>

SUMMARY OF THE INVENTION

Technical Problem

With the method of the related art, it is necessary to operate separate software from the BI tool, and it is not possible to attach electronic labels efficiently to an image of visualized data. Also, in situations where it is desirable to check an image with electronic labels attached and then re-examine the state of the same image in the BI tool, there is a problem of being unable to directly restore the screen of the BI tool from the image with electronic labels attached.

Means for Solving the Problem

To address the problems described above and achieve the objective, a display control device according to the present invention includes an acquisition unit that acquires event data, the event data being data expressed as a set of fixed units of data, a display unit that uses the event data acquired by the acquisition unit to display an image of event data visualized by a predetermined visualization method, a storage unit that, in a case where an operation of attaching an electronic label to the image displayed by the display unit is received, stores information about the electronic label, the event data, and setting information related to the image when the electronic label was attached in association with each other in storage, and a restoration unit that, in a case where a specification of an electronic label to be restored from among electronic labels stored in the storage is received, acquires the data of the specified electronic label as well as the event data and setting information associated with the specified electronic label from the storage, and restores the image with the electronic label attached.

Effects of the Invention

According to the present embodiment, an effect is exhibited in which electronic labels can be attached efficiently to an image of visualized event data, and the state with the electronic labels attached can be restored easily.

BRIEF DESCRIPTION OF DRAWINGS

FIG. 3 is a diagram illustrating an example of an event data table.

FIG. 4 is a diagram illustrating an example of a label information table.

FIG. 5 is a diagram illustrating an example of an event data association table.

FIG. 6 is a diagram illustrating an example of an attachment time visualization setting table.

FIG. 19 is a diagram illustrating an example of an event data table with added tag information columns.

FIG. 22 is a diagram for explaining a display example in the case of displaying a label in association with the entire content of a diagram.

DESCRIPTION OF EMBODIMENTS

Hereinafter, embodiments of a display control device and a display control method according to the present application will be described in detail on the basis of the drawings. Note that the display control device and the display control method according to the present disclosure are not limited to the embodiments.

First Embodiment

In the following embodiment, the configuration of a display control device 10 and the flow of a process by the display control device 10 according to a first embodiment will be described successively, and finally the effects of the first embodiment will be described.

Configuration of Display Control Device

Figure 1:
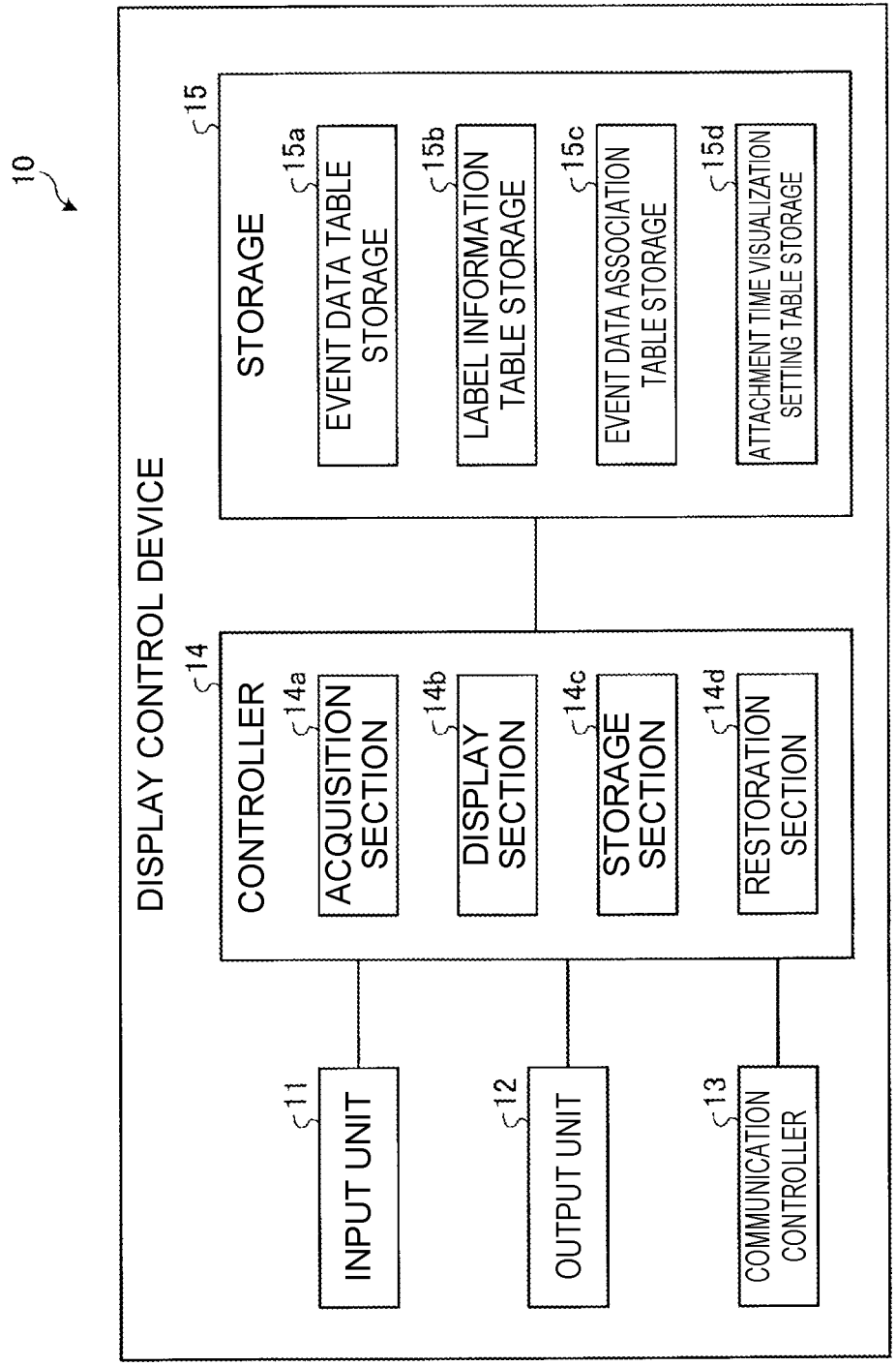
FIG. 1 is a diagram illustrating an example of the configuration of a display control device according to a first embodiment.

First, the configuration of the display control device 10 will be described using FIG. 1. FIG. 1 is a diagram illustrating an example of the configuration of the display control device according to the first embodiment. The display control device 10 is a device that assists with data analysis by adding/displaying electronic labels associated with a visual representation of event data in a system that treats a single value or a group of a plurality of values as a single unit (event) and visualizes event data represented as a set of events.

As illustrated in FIG. 1, the display control device 10 includes an input unit 11, an output unit 12, a communication controller 13, a controller 14, and storage 15. Hereinafter, the respective components will be described.

The input unit 11 is achieved using an input device such as a keyboard and mouse, and inputs various instruction information such as a process start instruction into the controller 14 in correspondence with an input operation performed by an operator. The output unit 12 is achieved by a display device such as a liquid crystal display, a print device such as a printer, or the like. For example, the output unit 12 outputs an image in which event data is visualized in a predetermined representation.

The communication controller 13 is a communication interface that transmits and receives various information with other devices connected through a network or the like. The communication controller 13 is achieved with a network interface card (NIC) or the like, and facilitates communication between another device and the controller 14 through an electric communication channel such as a local area network (LAN) or the Internet. For example, the communication controller 13 inputs event data inputted over the network or the like into the controller 14.

Figure 2:
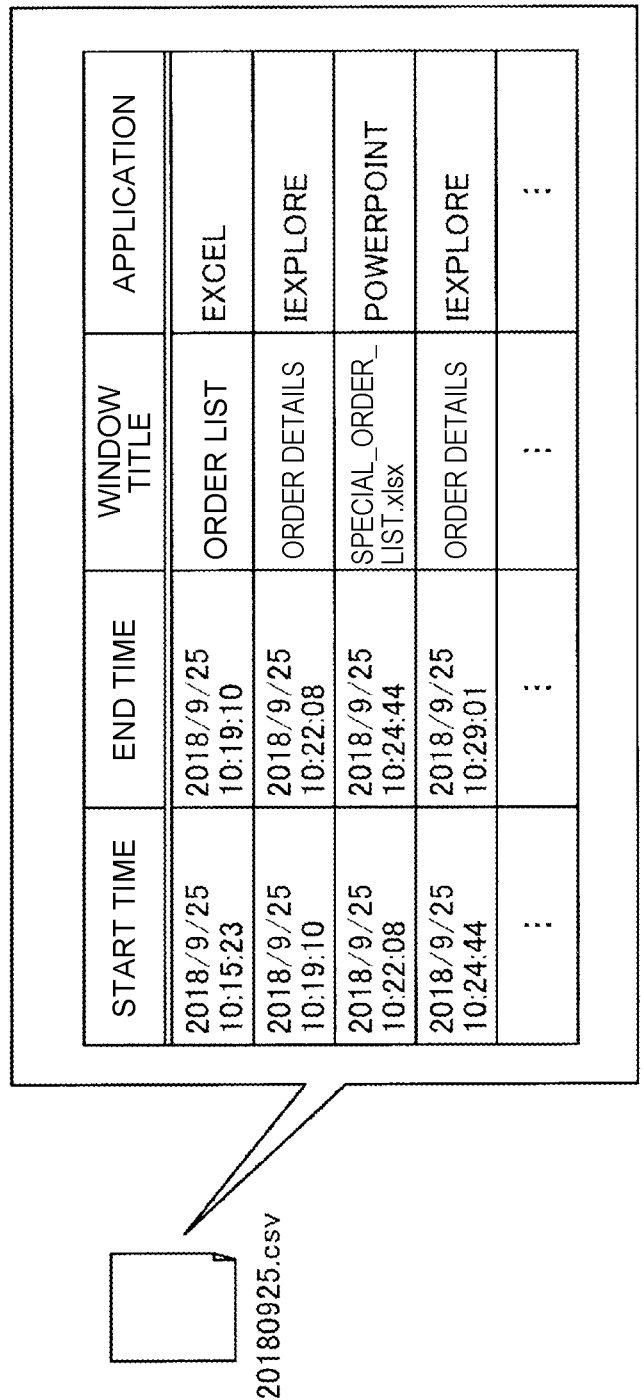
FIG. 2 is a diagram illustrating an example of event data.
Figure 7:
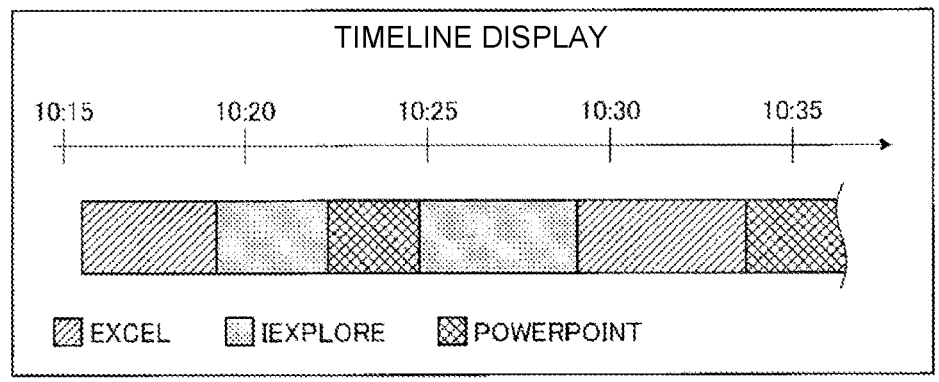
FIG. 7 is a diagram illustrating an example of a visual representation of active window history data.

At this point, FIG. 2 will be used to describe an example of the data structure of event data. FIG. 2 is a diagram illustrating an example of event data. The example in FIG. 2 is event data including a "start time" of an operation, an "end time" of the operation", a "window title" of the target of the operation, and "application" (a name identifying an application).

The event data exemplified in FIG. 2 is a logged history of the active window on a computer having a windowing system such as Windows®. The active window refers to a window in a state that accepts user input from devices such as mouse and keyboard. Note that only one active window exists at a time on a single screen.

The individual rows of the event data exemplified in FIG. 2 are groups of values constituting respective events, and the event data is represented as the set of all of rows. Additionally, the history of the active window includes time information, but the event data does not necessarily have to include time information. For example, information about the GDP per country in a certain year does not include time information, but is event data under the definition of the present embodiment. In the example of the present event data, information is saved in a comma-separated values (CSV) file, but information may also be saved in a different file format other than a CSV file, or in a database or the like.

The storage 15 is achieved by a semiconductor memory device such as random access memory (RAM) or flash memory, or by a storage device such as a hard disk or an optical disc, and stores information such as a processing program that causes the display control device 10 to operate and data used during the execution of the processing program. For example, the storage 15 includes event data table storage 15a, label information table storage 15b, event data association table storage 15c, and attachment time visualization setting table storage 15d.

The event data table storage 15a stores an event data table including information related to event data acquired by an acquisition section 14a described later. For example, as exemplified in FIG. 3, the event data table storage 15a stores an event data table associating a "serial number", a "source file path", a "row number", a "start time", an "end time", a "window title", and an "application". FIG. 3 is a diagram illustrating an example of an event data table.

The "serial number" is a unique ID for identifying an individual piece of event data. A different method may also be used insofar as each row is identifiable. Also, the "source file path" and the "row number" are information expressing the source from which the event data is loaded. Note that in this example, the numbering of the row numbers is assumed to start from the data rows, skipping a CSV title row. Also, in the case where the source is not CSV, it is necessary to choose appropriate items suitable for the type of source of events. Also, the "start time", the "end time", the "window title", and the "application" store the content of the CSV as-is.

In addition, the event data table exemplified in FIG. 3 illustrates a data example for the case where a plurality of CSV files are loaded at the same time by the acquisition section 14a. Note that the acquisition section 14a may load a single CSV file or load a plurality of CSV files. In addition, the acquisition section 14a may apply a filter when loading to load only a portion of the events. Moreover, the event data is not limited to CSV, and may be a file, data, or the like in a different format.

The label information table storage 15*b* stores a label information table including information related to electronic labels attached to an image of event data visualized by a predetermined visualization method. Specifically, the label information table storage 15*b* stores information associating a date and time of attaching an electronic label, a comment to be displayed on the electronic label, information indicating the position of the electronic label, information associated with the event data corresponding to an element in the image to which the electronic label is attached, and information associated with setting information related to a visual representation of the image when attaching the electronic label.

Here, FIG. 4 will be used to describe an example of the data structure of the label information table. FIG. 4 is a diagram illustrating an example of the label information table. For example, as exemplified in FIG. 4, the label information table storage 15*b* stores a "label number", an "attachment date and time", a "comment", "relative coordinates", an "event data association ID", and an "attachment time visualization setting ID" in association with each other.

The "label number" is a unique ID for managing an electronic label. Also, the "attachment date and time" is information about the date and time when the electronic label was attached. Note that the information does not have to be a date and time insofar as the information retains the timing when the electronic label was attached. The "comment" is a comment to be displayed on the electronic label. The "comment" may be freely changed by the user. Besides a comment, other data such as the username of the user who attached the electronic label may also be included.

The "relative coordinates" are information indicating the position where the electronic label is to be displayed from the center of each partial element forming a visual representation to which the electronic label is attached. In the present embodiment, the same relative coordinates are used for all visual representations for simplicity, but ordinarily it is desirable for the display position of the electronic label to be freely changeable by the user for each visual representation in many cases. The display position of the label may also not be changeable by the user, and always determined automatically. A line displayed to connect a label to an element in a visual representation is determined automatically in the present embodiment, but may also be freely changeable by the user.

The "event data association ID" is an ID for managing which event among the loaded event data is associated with the electronic label. The "attachment time visualization setting ID" is an ID for managing a setting for reproducing the state of the visual representation at the timing when the electronic label was attached.

The event data association table storage 15*c* stores an event data association table including correspondence relationships between information about electronic labels and event data. For example, as exemplified in FIG. 5, the event data association table storage 15*c* stores an "event data association ID" and an "event data serial number" in association with each other. FIG. 5 is a diagram illustrating an example of the event data association table.

The "event data association ID" is an ID referenced from the label information table. Also, the "event data serial number" is the serial number of the associated event in the event data table. A plurality of events may also be associated with an event data association ID.

The attachment time visualization setting table storage 15*d* stores information related to a setting of a visual representation when an electronic label was attached. Specifically, the attachment time visualization setting table storage 15*d* stores information related to the type of visualization method in the image on which the operation of attaching an electronic label is performed and information related to a display mode of the image as the information related to a setting of the visual representation. Note that the visual representation displayed by the display section 14*b*, such as the color specification, magnification, scrolling, and the position of each partial element, may be changed freely by the user under predetermined restrictions.

Here, FIG. 6 will be used to describe an example of the data structure of the attachment time visualization setting table. FIG. 6 is a diagram illustrating an example of the attachment time visualization setting table. For example, as exemplified in FIG. 6, the attachment time visualization setting table storage 15*d* stores an "attachment time visualization setting ID", a "visualization type", and a "visualization setting string" in association with each other.

The "event data association ID" is an ID referenced from the label information table. The "visualization type" is information that identifies the method of visualization. In the example of FIG. 6, the name of the visualization type is stored directly. The "visualization setting string" is information for restoring the state of the visual representation when the operation of attaching an electronic label was performed. The content that can be set in this information changes depending on the visualization type, and in the example of FIG. 6, the setting information is converted into a character string and saved for all visualization types.

The controller 14 includes internal memory for storing a program defining various processing sequences or the like and required data, by means of which various processes are executed. For example, the controller 14 is an electronic circuit such as a central processing unit (CPU) or a microprocessing unit (MPU). The controller 14 includes an acquisition section 14*a*, a display section 14*b*, a storage section 14*c*, and a restoration section 14*d*.

The acquisition section 14*a* acquires event data, that is, data expressed as a set of fixed units of data. For example, the acquisition section 14*a* acquires event data saved in a format such as a CSV file. For example, the acquisition section 14*a* acquires event data through the input unit 11 or the communication controller 13, and stores the acquired event data in the event data table storage 15*a*.

The display section 14*b* uses the event data acquired by the acquisition section 14*a* to display an image of event data visualized by a predetermined visualization method. For example, the display section 14*b* reads out the event data table from the event data table storage 15*a* and displays an image of visualized event data on the output unit 12 on the basis of the event data and a visualization setting set by the user. The user is able to attach an electronic label by performing a predetermined operation on the image displayed in this way. For example, in the case of receiving an operation of attaching an electronic label to the displayed image, the display section 14*b* displays the image with the electronic label attached.

Here, the example in FIGS. 7 to 10 will be used to describe examples of visual representations. FIGS. 7 to 10 are diagrams illustrating examples of visual representations of active window history data. For example, as exemplified in FIG. 7, the display section 14*b* may visualize the active window history data with a timeline display enabling the user to check changes in the active window over time.

Figure 8:
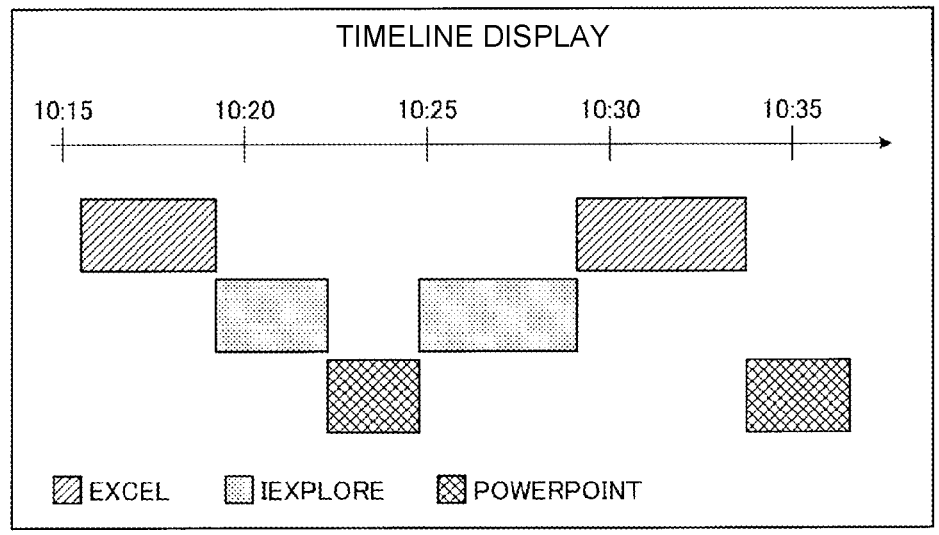
FIG. 8 is a diagram illustrating an example of a visual representation of active window history data.

Also, as exemplified in FIG. 8 as a different example of a timeline display, the display section 14*b* may also display different types of applications on separate rows to represent changes in the active window over time. In this way, the visual representation is not uniquely determined from the event data, but rather the user is able to apply various settings to make the event data easier to see. Note that the user is able to change settings with respect to properties such as "which pattern to apply to each application", "filtering the display to show a specific application", and "the scale of the time axis (the ratio of the units of time and the number of horizontal pixels)".

Figure 9:
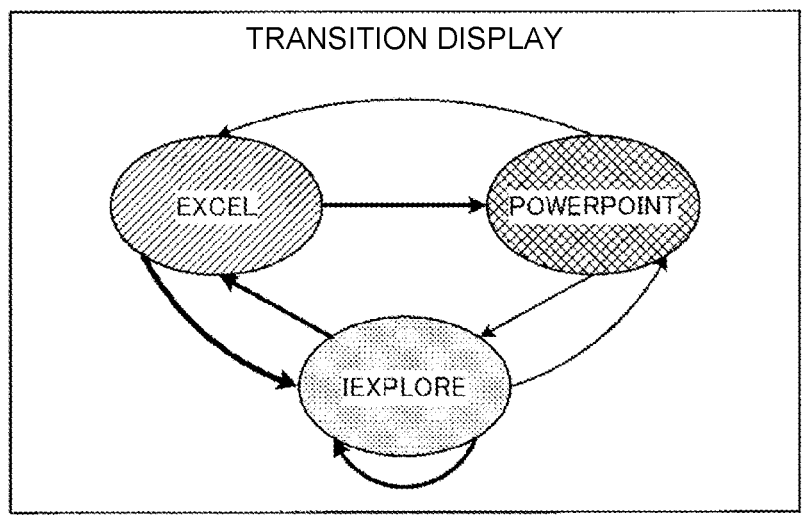
FIG. 9 is a diagram illustrating an example of a visual representation of active window history data.

As another example, as exemplified in FIG. 9, the display section 14*b* may also visualize transition relationships between applications as a graph of nodes and links, enabling the user to check the relationships among the applications. In the screen example in FIG. 9, transitions that occur more frequently are expressed with bold links. Also, in the screen example in FIG. 9, a link that departs from the same application node and returns back to itself exists because the same application may have a plurality of windows in some cases. Note that settings regarding the position of each node and link are freely changeable.

Figure 10:
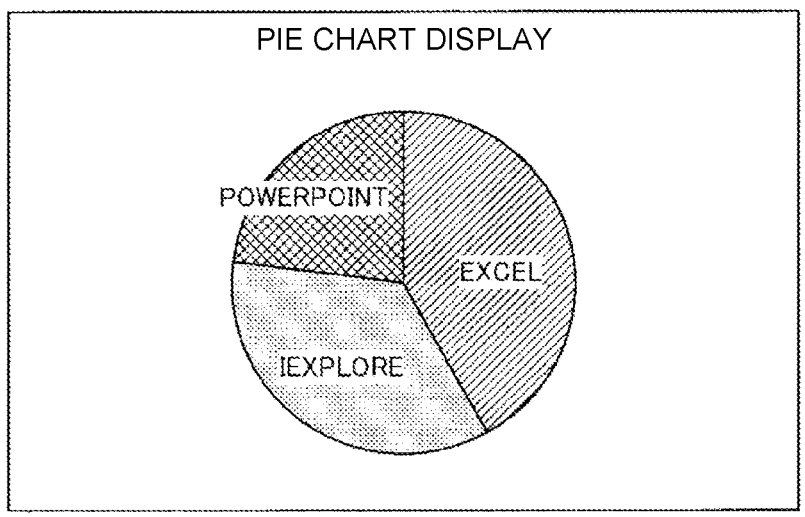
FIG. 10 is a diagram illustrating an example of a visual representation of active window history data.

In another example, as exemplified in FIG. 10, the display section 14*b* may visualize the active window history data as a pie chart enabling the user to check the proportional usage time of each application.

In the case of receiving an operation of attaching an electronic label to the image displayed by the display section 14*b*, the storage section 14*c* stores information about the electronic label, the event data, and setting information related to the image when the electronic label was attached in association with each other in the storage 15.

Specifically, as the information about the electronic label, the storage section 14*c* stores the date and time when the electronic label was attached, a comment displayed in the electronic label, information indicating the relative position of the electronic label, information associated with the event data corresponding to an element in the image to which the electronic label was attached, and information associated with setting information when the electronic label was attached in the label information table storage 15*b*.

In addition, as the setting information specifically, the storage section 14*c* stores the type of visualization method of the event data in the image to which the electronic label is attached and information related to the display mode of the image in the attachment time visualization setting table storage 15*d*.

For example, in the case of receiving an operation of attaching an electronic label to the image displayed by the display section 14*b*, the storage section 14*c* stores the data of the electronic label in the label information table storage 15*b*. As another example, the storage section 14*c* specifies event data corresponding to an element within the image to which the electronic label is attached, and stores an association between the electronic label and the event data in the event data association table storage 15*c*. As another example, the storage section 14*c* stores setting information related to the visualization method when the electronic label was attached in the attachment time visualization setting table storage 15*d*.

Figure 11:
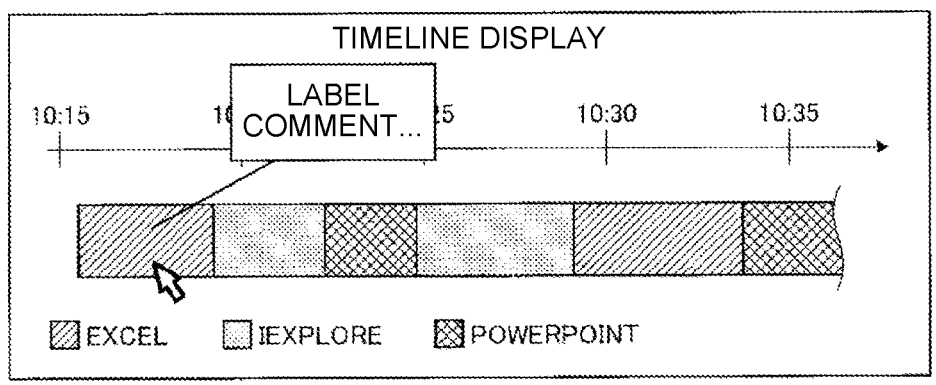
FIG. 11 is a diagram illustrating an example of a screen when attaching an electronic label to an image.

Here, the example in FIG. 11 will be used to describe an operation example when attaching an electronic label to an image. FIG. 11 is a diagram illustrating an example of a screen when attaching an electronic label to an image. For example, as exemplified in FIG. 11, the storage section 14*c* receives an operation of designating an element on the timeline display to which the user wants to attach an electronic label (such as through a context menu displayed by right-clicking, for example) as the operation by the user, and thereby attaches the electronic label to the image of the timeline display.

Additionally, the storage section 14*c* associates the attached electronic label with the event data corresponding to the element in the image to which the electronic label was attached. Note that the electronic label contains the label itself and an element (in this example, a line) indicating which element the label is connected to. Moreover, the electronic label itself is freely movable, and is freely changeable to allow a comment to be entered. Additionally, the electronic label is freely removable.

In the case of receiving the specification of an electronic label to be restored from among the electronic labels stored in the storage 15, the restoration section 14*d* acquires the data of the electronic label as well as the event data and setting information associated with the electronic label from the storage 15, and restores the image with the electronic label attached. At this time, the restored image may be displayed as a new image on the screen, or may be displayed so as to update an existing image.

For example, the restoration section 14*d* displays a list of the electronic labels stored in the storage 15, and in the case of receiving the specification of an electronic label to be restored from the list of electronic labels, the restoration section 14*d* acquires the data of the electronic label as well as the event data and setting information associated with the electronic label from the storage 15, and restores the state of the visual representation when the electronic label was attached.

Figure 12:
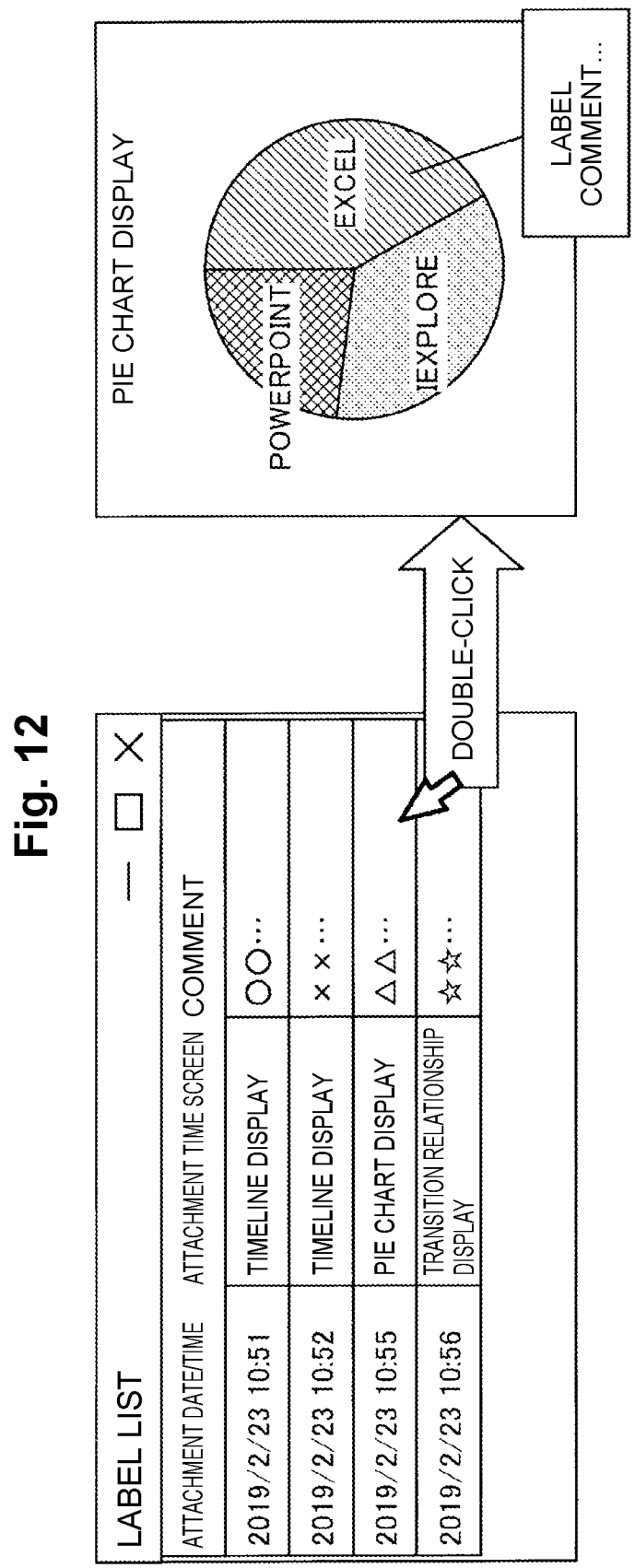
FIG. 12 is a diagram illustrating an example of a label list screen and a restored image.

Here, FIG. 12 will be used to describe the flow of a process during restoration. FIG. 12 is a diagram illustrating an example of a label list screen and a restored image. For example, if an operation of displaying a list of restorable electronic labels is received, the restoration section 14*d* displays a label list like the one exemplified in FIG. 12. In the example of FIG. 12, the restoration section 14*d* sorts the restorable electronic labels according to the attachment date and time of each electronic label as the list of electronic labels, but the restoration section 14*d* may sort the electronic labels according to another basis, and may also apply filtering when appropriate. The function that restores the state of a visual representation may be called not only by an operation performed on the label list screen, but also by an operation performed on an electronic label displayed in a visualized image (for example, through a context menu displayed as a right-click menu).

Additionally, after the list of electronic labels is displayed, if an electronic label to be restored is selected by an operation such as a double-click, the restoration section 14*d* restores the image from when the electronic label was attached. For example, from the label information table storage 15*b*, the restoration section 14*d* reads out information about the electronic label selected from the list of electronic labels. Additionally, from the event data association table storage 15*c*, the restoration section 14*d* reads out the event data serial number corresponding to the event data association ID among the information read out from the label information table storage 15*b*.

Moreover, from the event data table storage 15*a*, the restoration section 14*d* reads out the event data corresponding to the event data serial number. Also, from the attachment time visualization setting table storage 15*d*, the restoration section 14*d* reads out the setting information (visualization type and visualization setting string) of the visual representation corresponding to the attachment time visualization setting ID among the information read out from the label information table storage 15b.

Thereafter, the restoration section 14d uses the information about the electronic label, the event data, and the setting information of the visual representation read out from the storage 15 to recreate the screen from when the electronic label was attached, and displays the recreated screen on the output unit 12. Note that because the attached electronic label is associated with event data, if there is an element applied to the same event data between different types of visualization displays, a comment can be displayed in common between the visualization displays. For example, as exemplified in FIG. 13, the same "comment 2" may be displayed in common between a screen display of a transition chart and a screen display of an application pie chart. In such a case, the electronic label may be displayed in common if the electronic label is associated with exactly the same event (which may be a single event or a group of multiple events), or the electronic label may be displayed for an element partially shared in common between events as necessary.

Processing Sequence by Display Control Device

Figure 14:
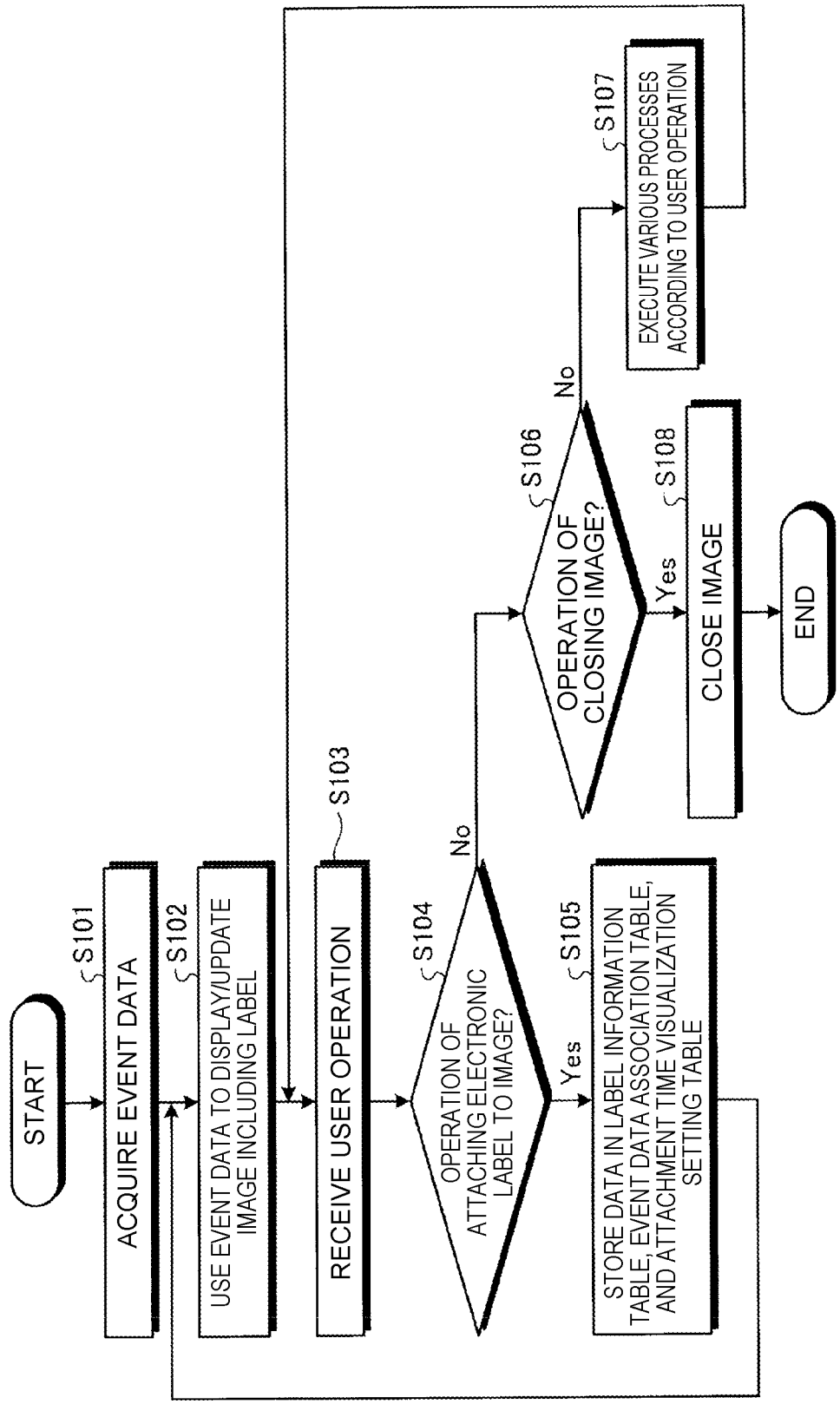
FIG. 14 is a flowchart illustrating an example of the flow of an electronic label attachment process in the display control device according to the first embodiment.
Figure 15:
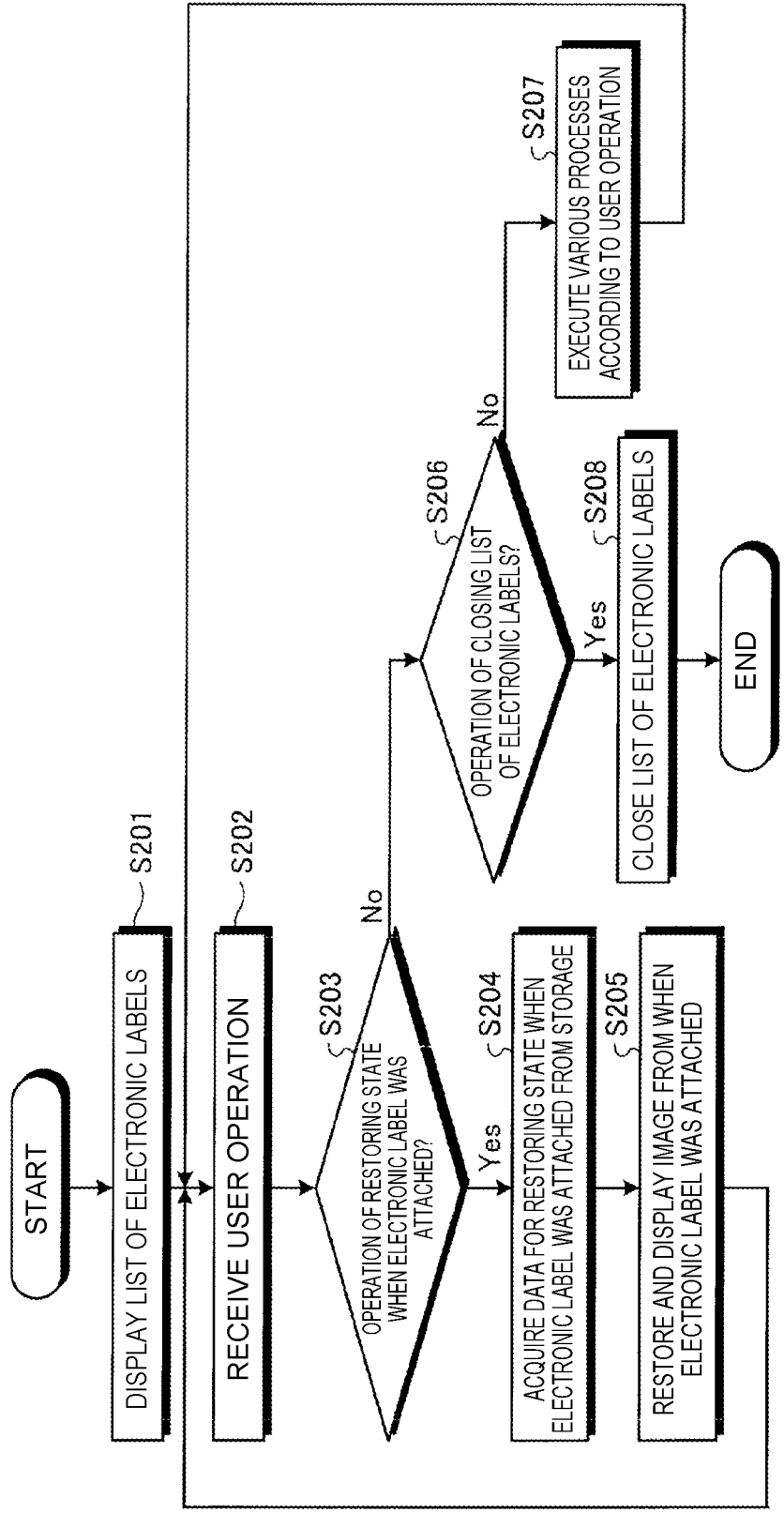
FIG. 15 is a flowchart illustrating an example of the flow of an image restoration process in the display control device according to the first embodiment.

Next, FIGS. 14 and 15 will be used to describe an example of a processing sequence by the display control device 10 according to the first embodiment. FIG. 14 is a flowchart illustrating an example of the flow of an electronic label attachment process in the display control device according to the first embodiment. FIG. 15 is a flowchart illustrating an example of the flow of an image restoration process in the display control device according to the first embodiment.

First, FIG. 14 will be used to describe the flow of the electronic label attachment process. As exemplified in FIG. 14, the acquisition section 14a of the display control device 10 acquires event data (step S101). Thereafter, the display section 14b uses the event data acquired by the acquisition section 14a to display/update an image including labels (step S102). For example, the display section 14b reads out the event data table from the event data table storage 15a and displays an image of visualized event data on the output unit 12 on the basis of the event data and a visualization setting set by the user.

Next, if a user operation is received (step S103), the display section 14b determines whether the received user operation is an operation of attaching an electronic label to the image (step S104).

As a result, in the case of determining that the operation is an operation of attaching an electronic label to the image (step S104, Yes), the storage section 14c stores data in the label information table, the event data association table, and the attachment time visualization setting table (step S105). Specifically, the storage section 14c stores the electronic label, the event data, and setting information related to the image when the electronic label was attached in association with each other in the storage 15, and returns to step S102. For example, in the case of receiving an operation of attaching an electronic label to the image displayed by the display section 14b, the storage section 14c stores the data of the electronic label in the label information table storage 15b. As another example, the storage section 14c specifies event data corresponding to an element within the image to which the electronic label is attached, and stores an association between the electronic label and the event data in the event data association table storage 15c. As another example, the storage section 14c stores setting information related to the visualization method when the electronic label was attached in the attachment time visualization setting table storage 15d.

Also, returning to the description of step S104, in the case of determining that the operation is not an operation of attaching an electronic label to the image (step S104, No), the display section 14b determines whether the operation is an operation of closing the image (step S106). As a result, in the case of determining that the operation is not an operation of closing the image (step S106, No), the display section 14b performs various processes corresponding to the user operation (such as changing the state of the visual representation, for example) (step S107), and returns to step S103. Also, in the case of determining that the operation is an operation of closing the image (step S106, Yes), the display section 14b closes the image (step S108) and ends the process.

Next, FIG. 15 will be used to describe the flow of the image restoration process. As exemplified in FIG. 15, if an operation of displaying a list of restorable electronic labels is received, the restoration section 14d of the display control device 10 displays the list of electronic labels (step S201). Additionally, if a user operation is received (step S202), the restoration section 14d determines whether the operation is an operation of restoring the state when the electronic label was attached (step S203). As a result, in the case of determining that the operation is an operation of restoring the state when the electronic label was attached (step S203, Yes), the restoration section 14d acquires data for restoring the state of the image when the electronic label was attached from the storage 15 (step S204).

For example, from the label information table storage 15b, the restoration section 14d reads out information about the electronic label selected from the list of electronic labels. Additionally, from the event data association table storage 15c, the restoration section 14d reads out the event data serial number corresponding to the event data association ID among the information read out from the label information table storage 15b. Moreover, from the event data table storage 15a, the restoration section 14d reads out the event data corresponding to the event data serial number. Also, from the attachment time visualization setting table storage 15d, the restoration section 14d reads out the setting information (visualization type and visualization setting string) of the visual representation corresponding to the attachment time visualization setting ID among the information read out from the label information table storage 15b.

Thereafter, the restoration section 14d uses the information about the electronic label, the event data, and the setting information of the visual representation read out from the storage 15 to restore and display the image from when the electronic label was attached (step S205), and returns to step S202.

Also, returning to the description of step S203, in the case of determining that the operation is not an operation of restoring the state when the electronic label was attached (step S203, No), the restoration section 14d determines whether the operation is an operation of closing the list of electronic labels (step S206). As a result, in the case of determining that the operation is not an operation of closing the list of electronic labels (step S206, No), the restoration section 14d performs various processes corresponding to the user operation (such as scrolling or resorting, for example) (step S207), and returns to step S202. Also, in the case of determining that the operation is an operation of closing the list of electronic labels (step S206, Yes), the restoration section 14d closes the list of electronic labels (step S208) and ends the process.

Effects of First Embodiment

In this way, the display control device 10 acquires event data, that is, data expressed as a set of fixed units of data, and uses the acquired event data to display an image of the event data visualized according to a predetermined visualization method. Additionally, in the case of receiving an operation of attaching an electronic label to the displayed image, the display control device 10 stores information about the electronic label, the event data, and setting information related to the image when the electronic label was attached in association with each other in the storage 15. Also, in the case of receiving the specification of an electronic label to be restored from among the electronic labels, the display control device 10 acquires the data of the electronic label as well as the event data and setting information associated with the electronic label from the storage 15, and restores the image with the electronic label attached. Consequently, the display control device 10 is capable of efficiently attaching an electronic label to an image of visualized event data, and easily displaying the image with the electronic label attached.

Also, the display control device 10 is capable of applying an electronic label to various representations of visualized event data, making it possible to efficiently record a wide variety of insights big and small during the work of analyzing the event data. Also, because the display control device 10 manages the electronic labels in chronological order of being recorded, and has a function of reproducing the state when an electronic label was attached, it is possible to efficiently track the flow of analysis work from the electronic labels.

Furthermore, because a label is associated with event data internally, the display control device 10 is capable of causing an electronic label to be displayed in common between various visual representations, such as visual representations that do not have a time axis. Consequently, with the display control device 10, it is easy to compare a plurality of visual representations through electronic labels.

Embodiment 1-1

In visual representations of the related art, technologies that assist with high-level analysis while heuristically checking the visualization process as the user freely abstracts and groups data have been achieved. The following three citations are example of such reference literature. The first is "6. Conclusions and future predictions: We investigated a method of executing the work of shaping operation logs while checking the visualization process without shaping the contents of the operation log data by providing a function enabling the analyzer to group multiple nodes to be visualized as a single node in the visualization result" in Reference Literature 1-1. The second is "1. Introduction: In this method, the user is able to group data at any chosen granularity, such as system or window, to match the analysis goal, and thereby display a list of required elements and assist with multi-faceted analysis by the user" in Reference Literature 1-2. The third is "4.3. Modeling method and development environment architecture: By creating an overall process definition incrementally from simple process definitions, we discovered that a systemic model can be created while preventing redundant descriptions" in Reference Literature 1-3. Here, the high-level analysis mainly refers to comparing large-scale, complex data flexibly and from various perspectives. The following embodiment describes a case of expanding embodiment 1 to display labels cross-sectionally in a plurality of visualization displays for such high-level analysis to enable easy visual comparison.

Figure 13:
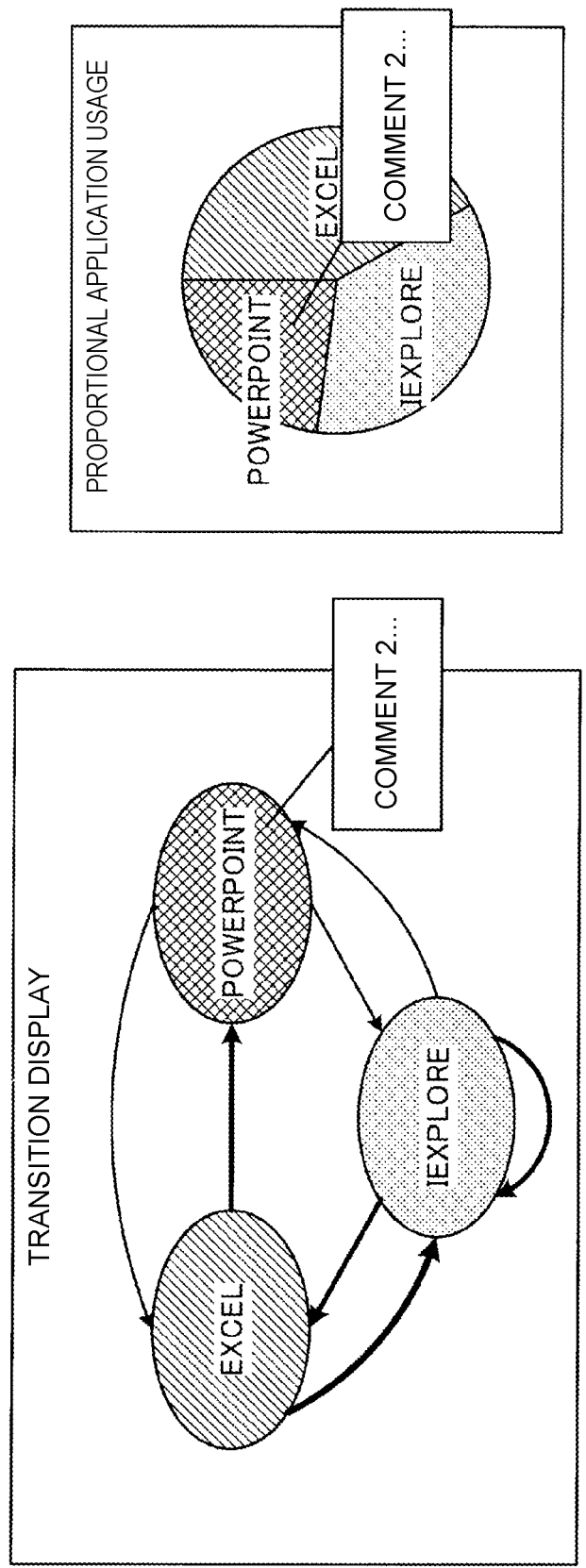
FIG. 13 is a diagram for explaining a label display for different representations.
Figure 16:
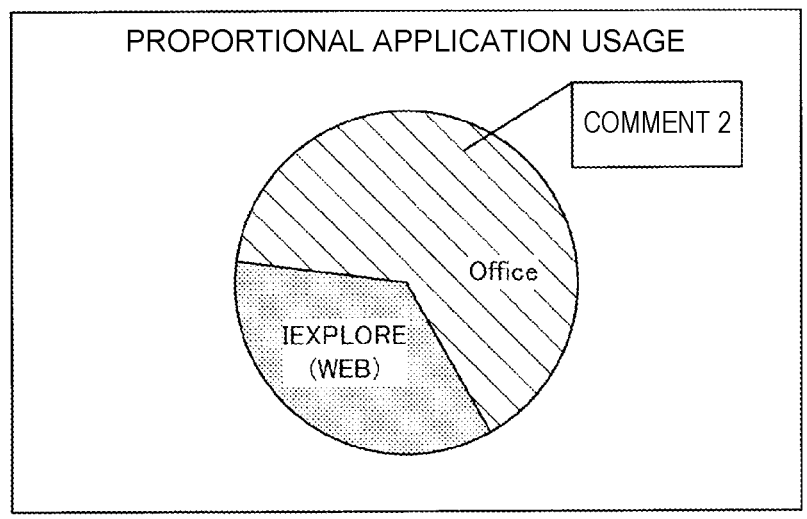
FIG. 16 is a diagram for explaining a label display example.

For example, as a variation on FIG. 13 described above, if a label could be displayed even in a visual representation from a slightly different perspective as in FIG. 16, the breadth of the comparison work by the user would be broadened and efficiency would be improved. In such a case, the electronic label may be displayed in common if the electronic label is associated with exactly the same event (which may be a single event or a group of multiple events), or the electronic label may be displayed for an element partially shared in common between events as necessary.

The case in which an element is partially shared in common between events as necessary refers to cases like the following, for example. A label associated with event data in a certain visual representation is attached to a set A, and in a different type of visual representation, a set B of coarser granularity including the associated event data set is displayed as a single unit. FIG. 16 is one example of the above case. In this case, the label is displayed with respect to the large set B, and the determination basis of determining whether or not to display the label is "A is included in B".

Figure 17:
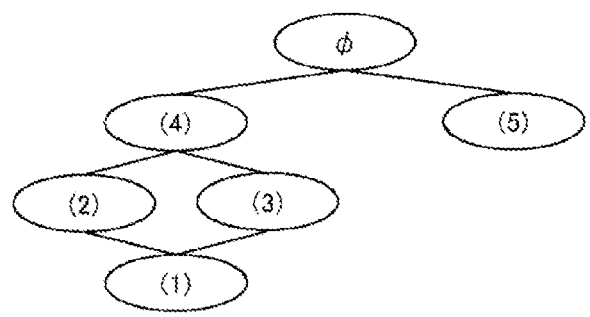
FIG. 17 is a diagram for explaining a determination basis.

Another setting may also be used for the determination basis, and a more generalized concept is as follows. The relationship between a set A associated with label creation and a set B to be determined can be classified into (1) the case where A and B are the same, (2) the case where A is included in B, (3) the case where B is included in A, (4) the case where there is some kind of intersection, and (5) the case where there is no intersection of any kind. In some cases, more than one of the classifications (1) to (4) may apply at the same time, and the classifications have inclusion relations as illustrated in FIG. 17 for example.

Figure 18:
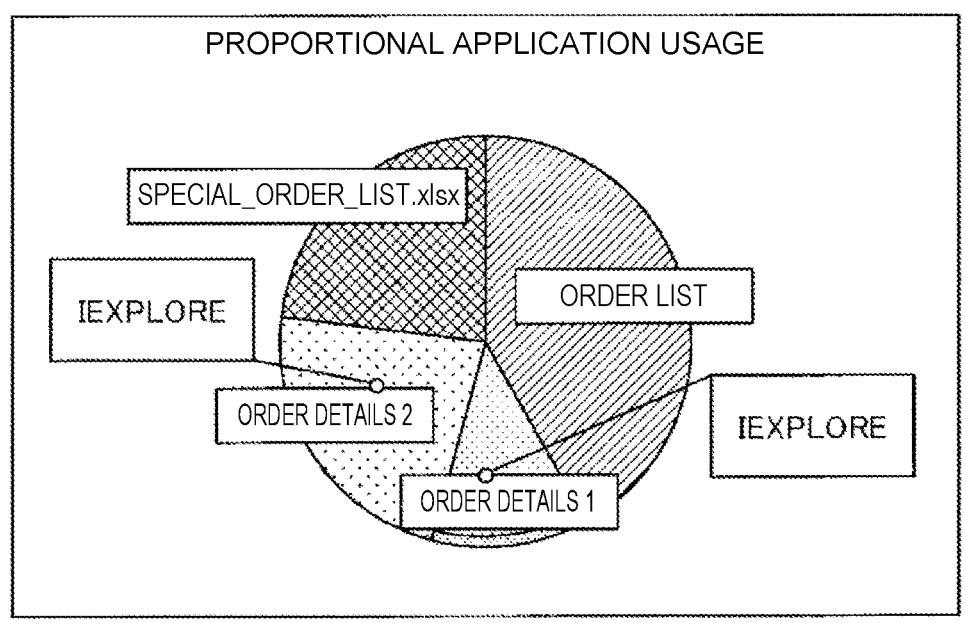
FIG. 18 is a diagram for explaining a label display example.

In the visualization type for which the label was created, the classification is either (1) or (5), and a set applicable to another classification should not occur. Therefore, adopting (1) as the condition on displaying the label is self-evident, and it is not necessary to consider the other conditions. However, in a visualization type different from the one when the label was created, the classifications (1) to (4) may occur, and to display the label with respect to the intended set, it is necessary to specify a condition appropriately. In the case of a visualization type in which a set of coarse granularity including the originally specified set is displayed as a single unit, it is conceivable to display the label with respect to the large set as a basic setting. In this case, it is appropriate to specify (2) as the condition. The above corresponds to the example illustrated in FIG. 16. On the other hand, in the case of a visualization type in which a set of fine granularity corresponding to a subset of the originally specified set is displayed as a single unit, it is conceivable to display the label with respect to the smaller set. In this case, it is appropriate to specify (3) as the condition. The above corresponds to the example illustrated in FIG. 18.

At this point, the label displayed according to (2) may be interpreted by the user as having a different meaning from the label displayed according to (1) in some cases. In some cases, the same label for the visual representation displayed according to (1) may not be displayed in a different visual representation. Accordingly, the display according to (2) informs the user with a modified representation achieved by displaying the label with a color of lower brightness, displaying a small icon in a portion of the label, or the like.

On the other hand, the number of labels when a single label is displayed in multiple locations is 1 or 0 for the display according to (2), but 1 to N according to (3), where N is the number of elements in the set A. If N is large, there is a problem in that a large number of labels will be displayed in the visual representation. To make it easier for the user to grasp the visual representation, annotations may be displayed instead of labels. An annotation is displayed using a small icon to occupy less space, and by hovering over or clicking on an icon with a mouse pointer, the label is displayed. By appropriately filtering the amount of information to be presented to the user at the same time, the problem described above can be resolved. Also, a different type of icon may be used for each label, and a legend may be displayed such that if the user selects an icon on the legend, the display of the icon is enlarged or the label is displayed.

The above embodiment handles simple cases, and the information identifying the events that act as the basis of the sets is the application type. When associating events with sets of coarser or finer granularity, an implicit application group (Office series) or window instance (title) is used. To handle complex cases, an approach that extends to a variety of visualization types and visualization settings and assigns predetermined tags as information that explicitly identifies events may be adopted. Associating events with a set of coarse granularity corresponds to grouping elements, while associating events with a set of fine granularity corresponds to the opposite operation.

FIG. 19 illustrates event rows with added tag information columns. The values of the tag columns may be assigned by predetermined determination logic, such as classification by application name, window title name, or a time period of the start/end times. If various additional types of attribute columns exist in the rows, various types of tags may also be introduced. For example, a value of a manual tag column set from a freely chosen perspective by the user may also be assigned. The above may also be performed by the operation of attaching an electronic label to the image by the display section 14*b*. Alternatively, as a different configuration, the above may be performed by "3.2. Processing sequence of proposed method" in Reference Literature 1-1 or "3.2.2. Element grouping" in Reference Literature 1-2. Furthermore, a multidimensional array treated as the internal representation of "4.2. Internal representation method of process" in Reference Literature 1-3 may be defined first, and then a value of a tag column may be assigned indirectly.

In such circumstances (particularly Reference Literature 1-3), simply increasing or decreasing the granularity of the original set is no longer sufficient. In FIG. 19, Tag 1 makes the granularity of the basic category (application) coarser, but Tag 2 makes the granularity finer, and Tags 3 to 5 are unrelated to granularity. Here, association from a coarser perspective corresponds to abstraction, while association from a finer perspective corresponds to the opposite operation.

Given such relationships among the sets, operations more complex than grouping occur in some cases. For example, cases that newly correspond to the classification (4) as a condition occur. Also, the simple case of "0 or 1 according to (2) and 1 to N according to (3)" (the possibility of a single label being 0 or multiple is only one or the other) no longer holds. Furthermore, depending on the overall content of the data, one portion may exist in a complex relationship while another portion may exist in a simple relationship in some cases. Generally, if the condition (4) is specified for a complex portion, labels will be displayed on each and every element, making the relationships difficult to understand. In such circumstances, it is beneficial to specify the condition (1) to display the labels only when the labels correspond to the same set, and specify the condition (2) or (3) to display the labels in portions where the correspondence relationships are simple. Also, depending on the user's intention regarding what information to convey to users looking at individual visual representations, it may be desirable to display labels according to the condition (4) even in complex cases, and it is beneficial to enable the selective specification of such a display. As above, it is desirable to be able to appropriately specify how to convey information through visual representations depending on the user's intention. Consequently, as a basic setting, it is necessary to enable the user to appropriately select which of the conditions (1) to (4) to apply. Furthermore, it is necessary to enable the user to make the selection in an easy-to-understand way on the basis of the relationships in FIG. 17.

Figure 20:
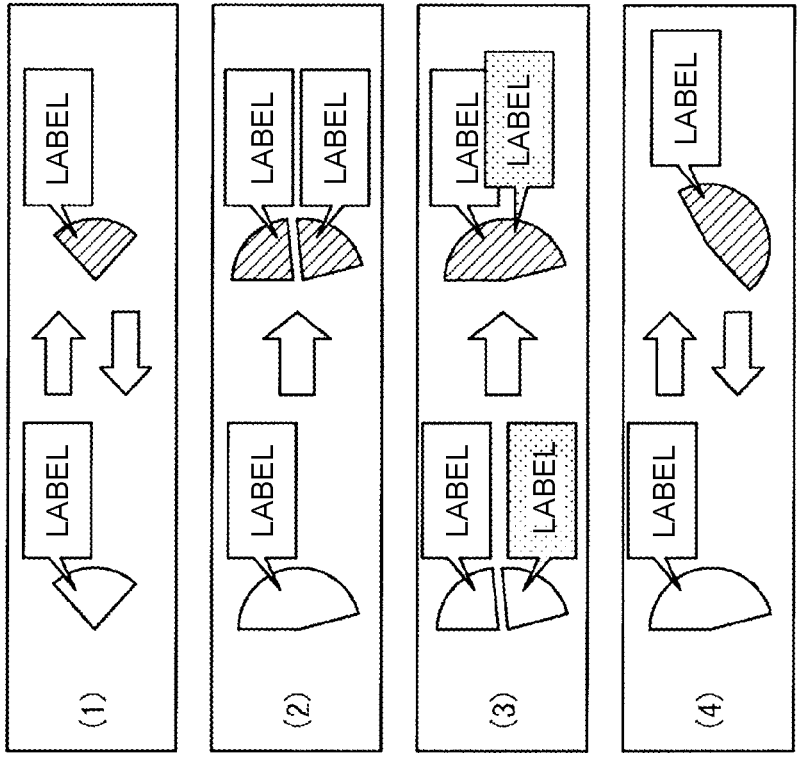
FIG. 20 is a diagram illustrating an example of a display condition setting screen.
Figure 21:
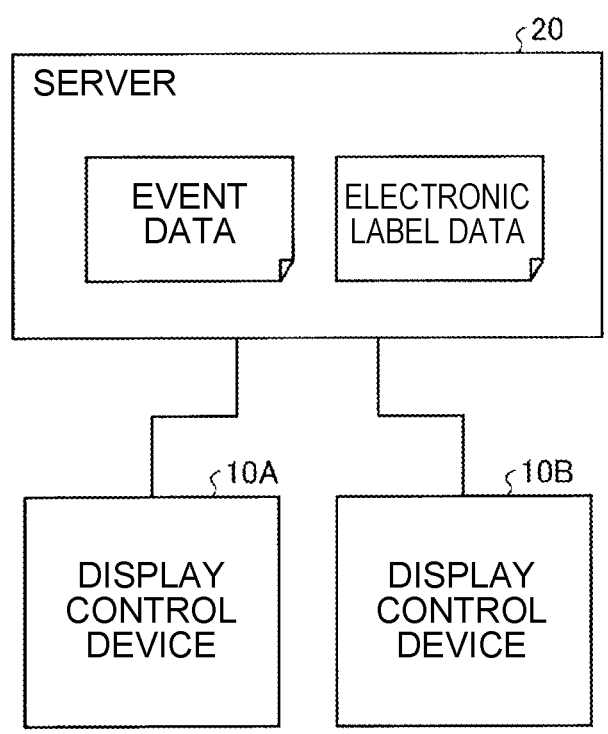
FIG. 21 is a diagram illustrating an example of the configuration of a display control system according to a modification.

FIG. 20 is an embodiment of a condition selection GUI. By having the user select one of the radio buttons on the left, one of the corresponding icons (1) to (4) on the right is highlighted. The icons intuitively express how the graphical elements (fan-shaped pieces of a pie chart) and the labels correspond in a predetermined condition. For example, FIG. 20 is a situation in which the first item "Display only if figure exactly matches label target" has been selected. At this time, only the icon (1) on the right side is highlighted. If the user selects the second item, the icons (1) and (2) on the right side are highlighted at the same time. If the user selects the third item, (1) and (3) are highlighted, and if the user selects the fourth item, (1) to (4) are all highlighted at the same time. Here, if selection/non-selection is set individually for each icon on the right side, the setting means would self-evidently cover all conditions logically. However, if only (3) is set without setting (1), the exclusion of (1) would be difficult to understand intuitively, and there is a risk of specifying an unintended setting. In other words, from simply looking at the icon of (3), there is a problem that it is unclear whether the meaning denotes a subset or a proper subset, and the user must look at the relationship of the settings for both (1) and (3). Accordingly, the above problem is resolved by providing a means of expressing and selecting from typical intended settings with descriptive bullet points (corresponding to the radio buttons on the left side), and at the same time providing a confirming means that lists how each selection corresponds to a display example (corresponding to the highlighted display on the right side). The GUI setting may be applied as a common setting for all visualization displays, or the selection content may be stored individually for each label. The restoration section 14*d* restores the image with the electronic label attached on the basis of the display condition specified by the setting screen.

1-1 Effects of Embodiment 1

In this way, the present embodiment exhibits an effect in which the display control device attaches electronic labels to various data that has been abstracted/grouped in complex ways and displays the labels cross-sectionally in a plurality of visualization displays, thereby enabling visual comparison.

Embodiment 2

By sharing event data and electronic label data (the label information table, the event data association table, and the attachment time visualization setting table) between a plurality of display control devices 10A and 10B, visual representation images with labels attached may be displayed in the same way on the plurality of display control devices 10A and 10B. Hereinafter, a case where the event data and the electronic label data are shared between the plurality of display control devices 10A and 10B by adopting a server/client model will be described. Note that in the display control system according to the modification, a description is omitted for configurations and processes similar to the first embodiment.

FIG. 16 is a diagram illustrating an example of the configuration of a display control system according to the modification. For example, as exemplified in FIG. 16, a display control system 100 includes display control devices 10A and 10B, and a server 20.

The server 20 manages event data and electronic label data shared between a plurality of display control devices 10A and 10B. The display control devices 10A and 10B acquire event data and electronic label data from the server 20, and perform processes similar to the processes described above to restore an image with an electronic label attached and display the restored image. Here, the electronic label data corresponds to the data in each table stored in the label information table storage 15b, the event data association table storage 15c, and the attachment time visualization setting table storage 15d. Note that the display control system 100 may also be configured as a mechanism without a server, in which the display control devices 10A and 10B load shared files.

In this way, by sharing information between a plurality of display control devices 10A and 10B, the display control system 100 enables multiple users to cooperate with each other easily to proceed with analysis.

Embodiment 2-1

Next, an embodiment for resolving the problems that arise when multiple users cooperate to perform analysis work will be illustrated. In the related art, in the case where setting information about a visual representation is shared through a server or the like, and multiple users cooperate to proceed with analysis, there is a problem of not knowing which user created the visualization setting and for what purpose. To avoid this, it is conceivable to manage visualization intentions with a separate means (such as a table document, a database, or a file management tool), for example, but with the technology of the related art, this involves many interruptions by operations and decisions that are unrelated to the original work of analysis/visualization, such as launching a separate means and opening a UI, entering/transcribing management information, and specifying a visual representation to extract management information, and consequently there is a problem in that the comparative analysis is impeded.

The following embodiments 2-1-1 to 2-1-3 describe cases where visualization intentions can be managed by the same operations and decisions that are related to the original work of analysis/visualization, and multiple users can cooperate to proceed with analysis without the comparative analysis being impeded.

Embodiment 2-1-1

As illustrated in FIG. 22, one means of attaching a label to a visual representation itself is to display the label not in association not with an element inside the visual representation, but instead in association with the entire content of the diagram. For example, in the case of receiving an operation of attaching an electronic label to the displayed image, the display section 14b may display the image with the electronic label attached. The above is achieved by adding a convenient event row including information about the context of analysis as dummy data in the event data table exemplified in FIG. 3. In the present embodiment, the information about the context of analysis expresses an acting party such as the username of the user who set the visual representation setting. In the dummy event row, tag columns storing the above information are set as necessary. Also, to distinguish the dummy event row from ordinary event rows, a tag column storing distinguishing information is set. In the case of an ordinary event row, the value of the tag column may be left blank, or a dummy value such as "NA" may be set.

In the case of receiving an operation of attaching an electronic label to the entire image displayed by the display section 14b, the storage section 14c generates dummy event data and stores information about the electronic label, the dummy event data, and setting information related to the image when the electronic label was attached in association with each other in the storage 15.

For example, in the case where a user saves a visualization setting, the storage section 14c automatically attaches the username as a label "creator: P1". Specifically, the storage section 14c generates a dummy event row, generates a row in the event data association table, generates a row in the label information table, and associates the rows with each other. "P1" is set in the tag column of the dummy event row.

The restoration section 14d restores a plurality of images grouped on the basis of the tags assigned to the dummy event data. For example, if the label of the username is selected, the restoration section 14d restores the display of the visual representation. At this time, if "P1" is included in the dummy event row, the condition (1) is satisfied, and therefore the label "creator: P1" is displayed as an overall label. The above operation/configuration is basically the same as Embodiment 1-1, differing only in whether a label is attached to an element or a diagram.

Note that in the case where the user has set a plurality of visualization settings, it is necessary to display the plurality of visualization displays. To achieve such an operation, it is necessary to provide a function of displaying multiple diagrams simultaneously as a new display type of the display section 14b.

As the specific operation/configuration for multiple simultaneous display, a method of opening multiple windows and a method of combining multiple displays into a tab panel are conceivable, and as a variation of the above, a method of the related art such as using thumbnails to present a list of multiple views can be applied. Regardless of which of these operations/configurations is adopted, a function that displays multiple diagrams (visual representations) simultaneously is sufficient, and is essentially unrelated to the effects achieved by the operation/configuration of the present invention.

Embodiment 2-1-2

For example, if a user performs analysis work for a month or longer, it is normal for the analysis perspective to change over a week or a shorter period. In the case where a plurality of users cooperate to distribute the analysis work over a predetermined period, it is desirable to be able to efficiently view/change the visual representation (or set of visual representations) for each analysis perspective according to oneself and others.

These demands can be satisfied by recording the time (end time) of saving a visual representation setting on a dummy event row, determining a corresponding analysis perspective name on the basis thereof, and assigning the determined analysis perspective name to a predetermined tag column in FIG. 19. Otherwise, like the foregoing embodiments, it is useful to be able to create an association table on the basis of the analysis perspective name (tag value) and present a simultaneous combined display of visual representations when required by the user.

Figure 23:
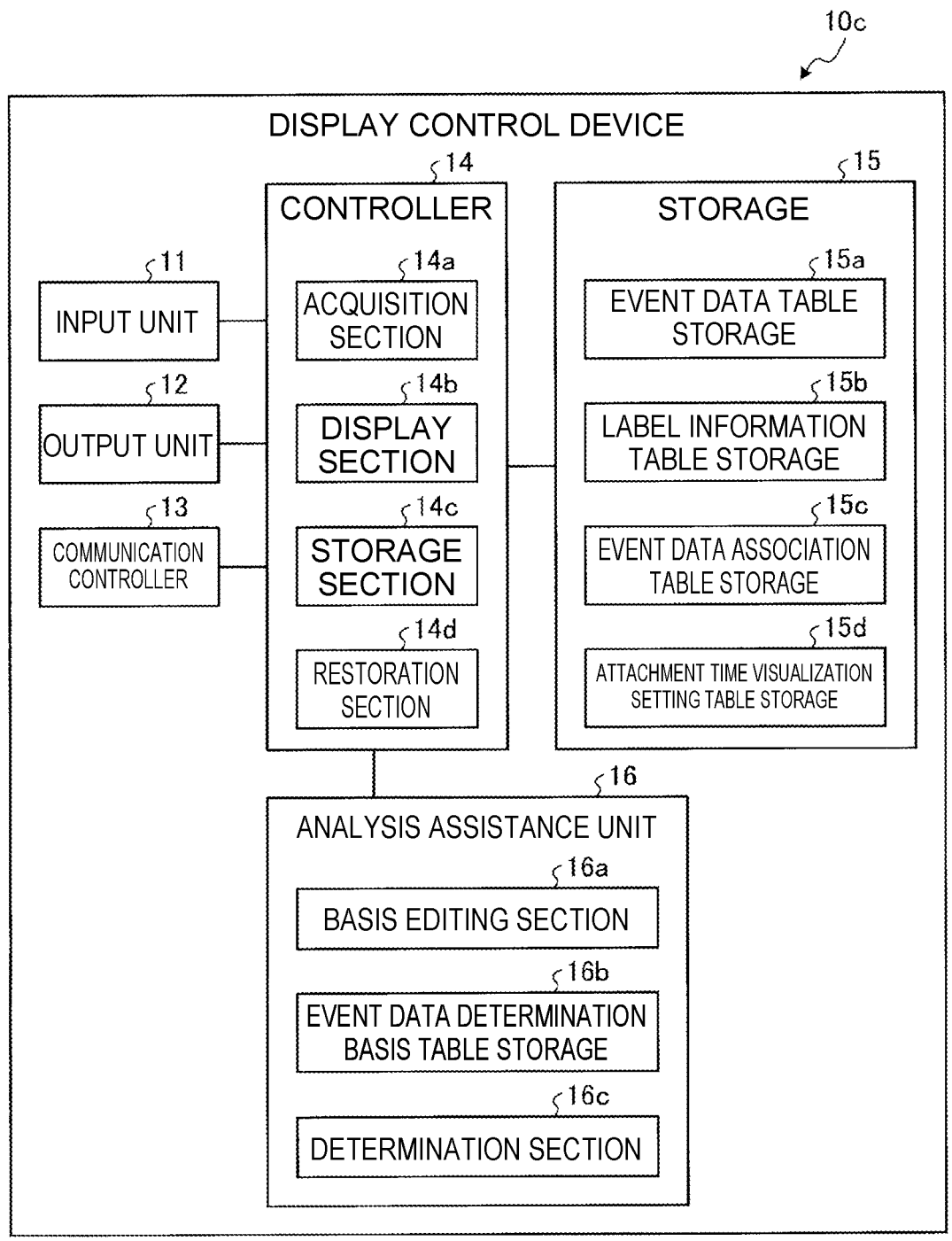
FIG. 23 is a diagram illustrating an example of the configuration of a display control device according to embodiment 2-1-2.

FIG. 23 illustrates a configuration according to the present embodiment. Here, an analysis assistance unit 16 is added to attach tags flexibly. The analysis assistance unit 16 includes a determination section 16c, an event data determination basis table 16b, and a basis editing section 16a. The determination section 16c determines a tag to assign to dummy event data on the basis of the dummy event data. For example, the determination section 16c assigns a tag as the value of a tag column on the basis of the end time of the dummy event data. The event data determination basis table 16b stores a work period for each analysis perspective, and is referenced by the determination section 16c. Initially, the table starts from an empty state, and the default tag value when a determination cannot be made is "NA". The basis editing section 16a uses the input unit 11 and the output unit 12 to provide functions for displaying/editing the event data determination basis table 16b to the user. Also, necessary information from the dummy event data about the actual visualization setting is displayed to make specification easier for the user. Also, when the user saves the visualization setting, the controller 14 is requested to add current context information about the analysis as dummy event data.

Figure 24:
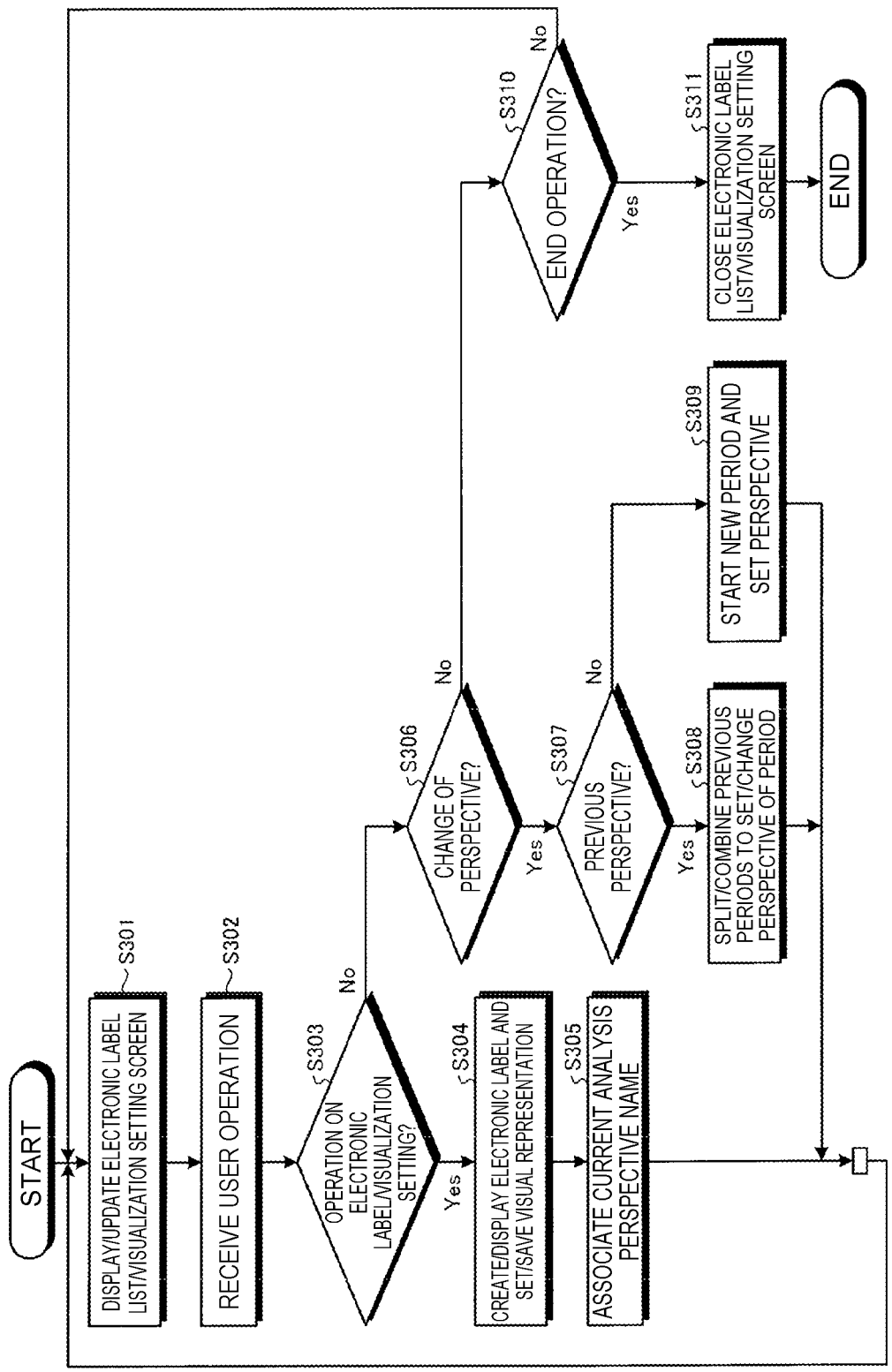
FIG. 24 is a flowchart illustrating an example of the flow of an image restoration process in the display control device according to embodiment 2-1-2.
Figure 25:
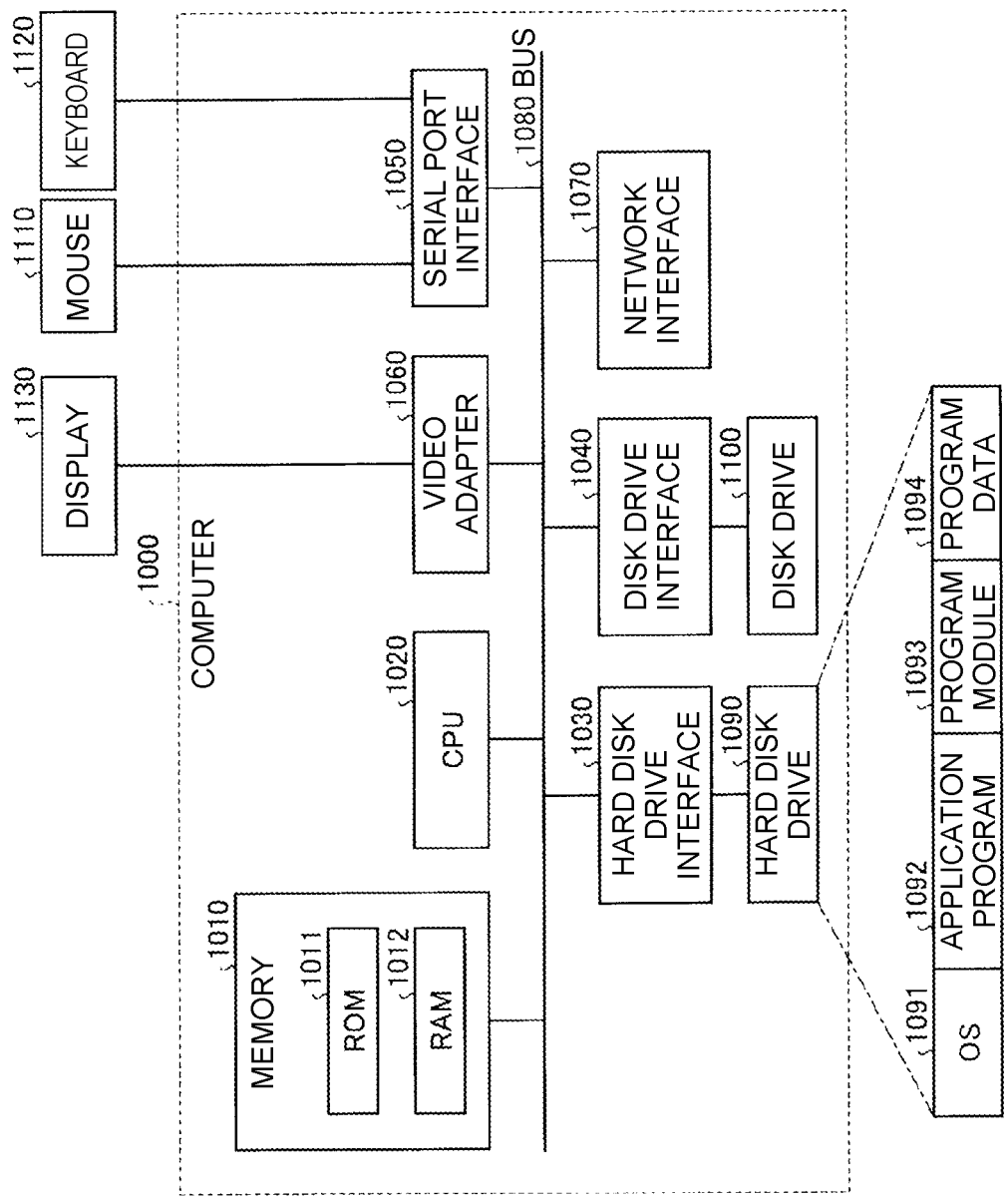
FIG. 25 is a diagram illustrating a computer that executes a display control program.

FIG. 24 illustrates a work procedure by the user according to the present embodiment. As exemplified in FIG. 24, when an operation of displaying/updating a list of restorable electronic labels or a visualization setting screen is received, the display control device 10c displays/updates the list of electronic labels or the visualization setting screen (step S301). Additionally, if a user operation is received (step S302), the display control device 10c determines whether the operation relates to an electronic label/visualization setting (step S303). As a result, in the case of determining that the operation relates to an electronic label/visualization setting (step S303, Yes), the display control device 10c creates/displays an electronic label and also sets/saves a visual representation (step S304). Additionally, the display control device 10c associates the current analysis perspective name (step S305), and returns to step S301.

Also, in the case of determining that the operation does not relate to an electronic label/visualization setting (step S303, No), the display control device 10c determines whether the user has specified a change of perspective (step S306). As a result, in the case of determining that the user has specified a change of perspective (step S306, Yes), the display control device 10c determines whether the change is a previous perspective (step S307).

As a result, in the case of determining that the change is a previous perspective (step S307, Yes), the display control device 10c changes the dummy event in the event data table to split/join previous periods and set/change the period perspective (step S308), and returns to the process in step S301. Also, in the case of determining that the change is not a previous perspective (step S307, No), the display control device 10c updates the event data table, starts a new period and sets the perspective (step S309), and returns to the process in step S301.

Also, in step S306, in the case of determining that the user has not specified a change of perspective (step S306, No), the display control device 10c determines whether the operation is an end operation (step S310). As a result, in the case of determining that the operation is not an end operation (step S310, No), the display control device 10c returns to the process in step S301. Also, in the case of determining that the operation is an end operation (step S310, Yes), the display control device 10c closes the electronic label list or visualization setting screen (step S311).

In this way, the user performs an operation of referencing a list of electronic labels and a visualization setting screen, like the first embodiment. In the case where the user specifies a change of perspective, if the change is a previous perspective, the dummy event data is corrected and the event data determination basis table is corrected. These processes are provided by the basis editing section 16a.

Although not described explicitly in Embodiment 1-1, the analysis assistance unit 16 may also be adopted/applied as an operation/configuration that assigns tag values from an application group (Office series) or a window instance (title). The operation/configuration of Embodiment 1-1 and the present embodiment is basically the same, and only differ in whether the information referenced by the determination section is a discrete value or a continuous value.

As above, the internal cooperation between the analysis assistance unit 16 and the controller 14 is not only the analysis assistance related to the end time, but shared generally for all processes that assign tags from other event data information. Consequently, a modification in which the controller 14 connects to multiple types of analysis assistance units or a modification in which the analysis assistance unit 16 is addable as a plugin module may also be adopted.

Embodiment 2-1-3

Instead of specifying the username as the information about the context of analysis like in the embodiment above, a purpose or motive for beginning the creation of the visual representation or a discovery or conclusion obtained after the creation is finished may also be specified as a keyword. By attaching a label to the entire display, information can be entered/viewed from a freely chosen perspective, like a comments field.

In the case where a plurality of keywords have a strong association, a new keyword that groups or abstracts the keywords may be specified by automatic extraction or manual selection, and can be treated as a higher-level goal/motive for a project, or as a discovery or conclusion regarding an abstract concept in the analysis perspective. In this case, the determination section 16c assigns a new tag from a different perspective of the event data on the basis of the tags assigned to the event data. Specifically, as a modification of the analysis assistance unit 16, it is sufficient to introduce a plugin module that automatically determines and assigns a new tag value from other tag values on an event row. Alternatively, the user may specify the new tag value manually according to the configurations in Reference Literature 1-1 to 1-3. The operation/configuration of the above embodiment and the present embodiment is basically the same, and only differ in whether a tag column is assigned directly from an ordinary column or assigned secondarily from another tag column.

Furthermore, by repeatedly applying the above operation, hierarchical grouping/abstraction can be achieved.

> Reference Literature 1-1: Urabe et al., "Study of Business Process Visualization Method using Operation Log", IEICE Tech. Rep., vol. 118, no. 483, ICM2018-64, pp. 83-88, March 2019.
> Reference Literature 1-2: Yagi et al., "A Visualization Technique of Multiple Window Usage for Operational Process Understanding", IEICE Tech. Rep., vol. 118, no. 303, ICM2018-29, pp. 27-32, November 2018.
> Reference Literature 1-3: Masuda et al., "A Modeling Method of Business Process with the Flexible Process Control Engine" (published jointly in the publications indicated below)
> IPSJ SIG Technical Reports, DSM [Distributed Systems/Internet and Operation Technology] 45, 115-120, May 10, 2007
> IEICE Technical Report, TM, Telecommunication Management 107 (30), 115-120, May 3, 2007

Effects of Embodiments 2-1-1 to 2-1-3

In Embodiment 2-1-1, dummy event data corresponding to when a visualization setting is saved by a user is generated and saved, and is used to display a label with respect to the visualization display itself. This has an effect of enabling analysis/visualization from a meta-perspective with respect to a user operation log of the visualization display tool.

Specifically, besides the automatic tagging by the analysis assistance unit 16 of Embodiment 2-1-2, tags are specified/changed by the hierarchical grouping/abstraction of Embodiment 2-1-3. In this case, the specific operation/configuration for multiple simultaneous display is a function that displays a plurality of diagrams hierarchically. For example, a collection of a plurality of lower-level diagrams may simply be displayed as a plurality of higher-level diagrams, a representative diagram may be extracted by a predetermined algorithm and displayed, a display combining the above two displays may be presented, or information in the lower-level diagrams may be aggregated, converted into a separate visual representation, and displayed.

As illustrated in FIG. 19, in the case of attaching a label cross-sectionally to a variety of visual representations, if the grouping/abstraction is complex, the label is not displayed when comparing to a display other than the relevant visualization display. This is even more noticeable with hierarchical grouping/abstraction like in Embodiment 2-1-3. These problems are resolved by providing the user with the display condition settings in FIG. 20 of Embodiment 1-1, and the effects of Embodiment 2-1-3 work effectively without being hindered.

The above demonstrates that through Embodiment 1-1 and Embodiments 2-1-1 to 2-1-3, a hierarchy containing a mixture of groupings/abstractions of data instances (target events) and groupings/abstractions of analysis metadata (dummy event rows) can be achieved with the same screen operations and the same processing methods. This arrangement exhibits the effect of enabling the user to handle how to interpret a set of target events and how to put together a set of visual representation settings for each analysis perspective efficiently through the same conceptual trial and error.

System Configuration and the Like

Also, the structural elements of the devices illustrated in the drawings are functional and conceptual illustrations, and are not limited to being physically configured exactly as depicted in the drawings. In other words, the specific modes in which the devices are separated or joined are not limited to the modes illustrated in the drawings, and all or part thereof may be functionally or physically separated or joined in any units according to factors such as various loads and usage conditions. Furthermore, all or any part of the processing functions performed by the devices may be achieved by a CPU and a program analytically executed by the CPU, or alternatively may be achieved as hardware by wired logic.

Additionally, all or part of the processes described in the embodiments as being performed automatically may also be performed manually, or alternatively, all or part of the processes described in the exemplary embodiments as being performed manually may also be performed automatically using known methods. Otherwise, information including the processing sequences, control sequences, specific names, and various data or parameters indicated in the above document and drawings may be freely modified unless specifically noted otherwise.

Program

FIG. 17 is a diagram illustrating a computer that executes a display control program. A computer 1000 includes a memory 1010 and a CPU 1020, for example. The computer 1000 also includes a hard disk drive interface 1030, a disk drive interface 1040, a serial port interface 1050, a video adapter 1060, and a network interface 1070. These components are connected by a bus 1080.

The memory 1010 includes read-only memory (ROM) 1011 and random access memory (RAM) 1012. The ROM 1011 stores a boot program such as a basic input/output system (BIOS), for example. The hard disk drive interface 1030 is connected to a hard disk drive 1090. The disk drive interface 1040 is connected to a disk drive 1100. A removable storage medium such as a magnetic disk or an optical disc is inserted into the disk drive 1100, for example. The serial port interface 1050 is connected to a mouse 1051 and a keyboard 1052, for example. The video adapter 1060 is connected to a display 1061, for example.

The hard disk drive 1090 stores an OS 1091, an application program 1092, program modules 1093, and program data 1094, for example. Namely, a program prescribing each process of the display control device 10 is implemented as a program module 1093 stated in computer-executable code. Each program module 1093 is stored in the hard disk drive 1090, for example. For example, program modules 1093 for executing processes similar to the functional configuration of the device are stored in the hard disk drive 1090. Note that the hard disk drive 1090 may also be replaced by a solid-state drive (SSD).

In addition, the data used in the processes of the embodiments described above is stored in the memory 1010 or the hard disk drive 1090 for example as the program data 1094. Moreover, the CPU 1020 loads the program modules 1093 and the program data 1094 stored in the memory 1010 or the hard disk drive 1090 into the RAM 1012 as necessary, and executes a program.

Note that the program modules 1093 and the program data 1094 are not limited to being stored in the hard disk drive 1090, and may also be stored in a removable storage medium and read out by the CPU 1020 through the disk drive 1100 or the like, for example. Alternatively, the program modules 1093 and the program data 1094 may be stored in another computer connected over a network or a WAN. In addition, the program modules 1093 and the program data 1094 may also be read out by the CPU 1020 from another computer through the network interface 1070.

REFERENCE SIGNS LIST

10, 10A, 10B display control device
11 input unit
12 output unit
13 communication controller
14 controller
14*a* acquisition section
14*b* display section
14*c* storage section
14*d* restoration section
15 storage
15*a* event data table storage
15*b* label information table storage
15*c* event data association table storage
15*d* attachment time visualization setting table storage
20 server
100 display control system

The invention claimed is:

1. A display control device comprising one or more processors configured to:
acquire event data, the event data being data expressed as a set of fixed units of data;
use the acquired event data to display an image including one or more elements corresponding to the event data visualized by a predetermined visualization method;
receive an operation of attaching an electronic label to an element included in the displayed image, wherein the electronic label comprises a user comment;
store information about the electronic label, the event data corresponding to the element, and setting information related to the image when the electronic label was attached to the element in storage;
display the image including i) the element, ii) the electronic label comprising the user comment attached to the element, and iii) a link between the element and the electronic label indicating the element and the electronic label are connected with each other;
in a case where a specification of an electronic label to be restored from among electronic labels stored in the storage is received, acquire the data of the specified electronic label as well as the event data and the setting information associated with the specified electronic label from the storage, and restore the image with the electronic label attached;
display a label list screen including a plurality of electronic labels;
receive a selection of a particular electronic label displayed on the label list; and
recreate and display a particular image including a particular element to which the particular electronic label is attached, using data of the particular electronic label, event data included in the particular image, and a display mode of the particular image.

2. The display control device according to claim 1, wherein the one or more processors are configured to:
store a date and time when the electronic label was attached, the comment displayed in the electronic label, information indicating a position of the electronic label, information associated with the event data corresponding to the element in the image to which the electronic label was attached, and information associated with the setting information when the electronic label was attached in the storage as the information about the electronic label.

3. The display control device according to claim 1, wherein the one or more processors are configured to:
store a type of visualization method of the event data in the image to which the electronic label is attached and information related to a display mode of the image in the storage as the setting information.

4. The display control device according to claim 1, wherein the one or more processors are configured to:
display a list of electronic labels stored in the storage, and in a case of receiving a specification of an electronic label to be restored from among the list of electronic labels, acquire the data of the specified electronic label as well as the event data and the setting information associated with the specified electronic label from the storage, and restore the image with the electronic label attached.

5. The display control device according to claim 1, wherein the one or more processors are configured to:
restore the image with the electronic label attached on a basis of a display condition specified by a setting screen.

6. The display control device according to claim 1, wherein the one or more processors are configured to:
in a case of receiving an operation of attaching an electronic label to an entire displayed image, generate dummy event data and store information about the electronic label, the dummy event data, and setting information related to the image when the electronic label was attached to the element in the storage.

7. The display control device according to claim 1, wherein the one or more processors are further configured to:
determine a tag to be assigned to the event data on a basis of the event data.

8. The display control device according to claim 1, wherein the one or more processors are configured to:
receive an operation of manually grouping elements in the image.

9. The display control device according to claim 7, wherein the one or more processors are configured to:
assign a new tag from a different perspective of the event data on a basis of the tag assigned to the event data.

10. A display control method executed by a display control device, the method comprising:
acquiring event data, the event data being data expressed as a set of fixed units of data;
using the acquired event data to display an image including one or more elements corresponding to the event data visualized by a predetermined visualization method;
receiving an operation of attaching an electronic label to an element included in the displayed image, wherein the electronic label comprises a user comment;
storing information about the electronic label, the event data, and setting information related to the image when the electronic label was attached to the element in storage;
displaying the image including i) the element, ii) the electronic label comprising the user comment attached to the element, and iii) a link between the element and the electronic label indicating the element and the electronic label are connected with each other;
acquiring, in a case where a specification of an electronic label to be restored from among electronic labels stored in the storage is received, the data of the specified electronic label as well as the event data and the setting information associated with the specified electronic label from the storage, and restoring the image with the electronic label attached;

displaying a label list screen including a plurality of electronic labels;

receiving a selection of a particular electronic label displayed on the label list; and recreating and displaying a particular image including a particular element to which the particular electronic label is attached, using data of the particular electronic label, event data included in the particular image, and a display mode of the particular image.

11. The display control method according to claim 10, comprising:

storing a date and time when the electronic label was attached, the comment displayed in the electronic label, information indicating a position of the electronic label, information associated with the event data corresponding to the element in the image to which the electronic label was attached, and information associated with the setting information when the electronic label was attached in the storage as the information about the electronic label.

12. The display control method according to claim 10, comprising:

storing a type of visualization method of the event data in the image to which the electronic label is attached and information related to a display mode of the image in the storage as the setting information.

13. The display control method according to claim 10, comprising:

displaying a list of electronic labels stored in the storage, and in a case of receiving a specification of an electronic label to be restored from among the list of electronic labels, acquiring the data of the specified electronic label as well as the event data and the setting information associated with the specified electronic label from the storage, and restoring the image with the electronic label attached.

14. The display control method according to claim 10, comprising:

restoring the image with the electronic label attached on a basis of a display condition specified by a setting screen.

15. The display control method according to claim 10, comprising:

in a case of receiving an operation of attaching an electronic label to an entire displayed image, generating dummy event data and storing information about the electronic label, the dummy event data, and setting information related to the image when the electronic label was attached to the element in the storage.

16. The display control method according to claim 10, comprising:

determining a tag to be assigned to the event data on a basis of the event data.

17. The display control method according to claim 16, comprising:

assigning a new tag from a different perspective of the event data on a basis of the tag assigned to the event data.

18. The display control method according to claim 10, comprising:

receiving an operation of manually grouping elements in the image.

* * * * *